US009602577B2

(12) United States Patent
Jackowski et al.

(10) Patent No.: US 9,602,577 B2
(45) Date of Patent: *Mar. 21, 2017

(54) SYSTEMS AND METHODS FOR QUALITY OF SERVICE OF ICA PUBLISHED APPLICATIONS

(71) Applicant: Citrix Systems, Inc., Fort Lauderdale, FL (US)

(72) Inventors: Steve Jackowski, Santa Cruz, CA (US); Seth Keith, Los Gatos, CA (US); Daljit Singh, San Jose, CA (US); Yao Li, Fremont, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,322

(22) Filed: Feb. 27, 2015

(65) Prior Publication Data
US 2015/0244767 A1    Aug. 27, 2015

Related U.S. Application Data

(63) Continuation of application No. 12/855,327, filed on Aug. 12, 2010, now Pat. No. 8,990,380.

(51) Int. Cl.
*G06F 15/173* (2006.01)
*H04L 29/08* (2006.01)
(Continued)

(52) U.S. Cl.
CPC ........ *H04L 67/025* (2013.01); *H04L 47/2475* (2013.01); *H04L 47/2483* (2013.01);
(Continued)

(58) Field of Classification Search
CPC ............. H04L 47/2433; H04L 47/2483; H04L 47/2475; H04L 47/2441; H04L 47/24; H04L 43/04

See application file for complete search history.

(56) References Cited

U.S. PATENT DOCUMENTS 6,917,588 B1    7/2005  Cao et al.
7,607,168 B1   10/2009  Tripathi et al.
(Continued)

FOREIGN PATENT DOCUMENTS

CN    101176306 A      5/2008
EP    1 722 509 A1    11/2006
(Continued)

OTHER PUBLICATIONS

"Classifying Network Traffic Using NBAR", May 7, 2007, pp. 1-26, Retrieved from the Internet: URL:http://www.cisco.com/en/US/docs/ios/124t/qos/configuration/guide/qsnbar1.pdf.
(Continued)

*Primary Examiner* — Nam Tran
(74) *Attorney, Agent, or Firm* — Foley & Lardner LLP; Christopher J. McKenna

(57) ABSTRACT

The present invention is directed towards systems and methods for providing discovery of applications for classification of a network packet for performing QoS and acceleration techniques. Remote display protocol traffic associated with a new application not previously included in a list of predetermined applications may be parsed for application information, and the new application may be added to the application list. The remote display protocol traffic may then be classified according to the new application, and network performance may be enhanced and optimized by providing QoS and acceleration engines with packet- or data-specific information corresponding to the newly identified application.

20 Claims, 14 Drawing Sheets

(51) Int. Cl.
*H04L 12/859* (2013.01)
*H04L 29/06* (2006.01)
*H04L 12/26* (2006.01)
*H04L 12/851* (2013.01)

(52) U.S. Cl.
CPC .......... *H04L 67/2819* (2013.01); *H04L 67/42* (2013.01); *H04L 43/028* (2013.01); *H04L 43/04* (2013.01); *H04L 47/2433* (2013.01); *H04L 47/2441* (2013.01); *H04L 67/322* (2013.01)

(56) References Cited

U.S. PATENT DOCUMENTS

| | | | |
|---|---|---|---|
| 8,638,795 | B2 | 1/2014 | Jackowski et al. |
| 2002/0122422 | A1* | 9/2002 | Kenney ............... H04L 47/2441 370/392 |
| 2004/0215955 | A1 | 10/2004 | Tamai et al. |
| 2004/0268149 | A1 | 12/2004 | Aaron |
| 2005/0083935 | A1 | 4/2005 | Kounavis et al. |
| 2006/0039372 | A1 | 2/2006 | Sarkinen et al. |
| 2007/0078955 | A1* | 4/2007 | Siliquini ............. H04L 47/2433 709/220 |
| 2007/0127483 | A1 | 6/2007 | Gilon et al. |
| 2007/0195714 | A1 | 8/2007 | Schales et al. |
| 2007/0204154 | A1 | 8/2007 | Swander et al. |
| 2007/0233804 | A1 | 10/2007 | Palekar et al. |
| 2008/0205403 | A1 | 8/2008 | Akyol et al. |
| 2008/0267177 | A1 | 10/2008 | Johnson et al. |
| 2008/0291827 | A1* | 11/2008 | Xiong ................. H04L 47/2433 370/230.1 |
| 2008/0291923 | A1 | 11/2008 | Back et al. |
| 2009/0040925 | A1* | 2/2009 | Holmstrom ............. H04L 47/15 370/230 |
| 2010/0158009 | A1 | 6/2010 | Lee et al. |
| 2011/0020038 | A1 | 1/2011 | Hatakeyama et al. |
| 2011/0106937 | A1 | 5/2011 | Upham et al. |

FOREIGN PATENT DOCUMENTS

| | | |
|---|---|---|
| GB | 2 365 668 A | 2/2002 |
| WO | WO-2006/120040 | 11/2006 |
| WO | WO-2010/042578 | 4/2010 |
| WO | WO-2010/074619 A1 | 7/2010 |

OTHER PUBLICATIONS

"WAN and Application Optimization Solution Guide", Aug. 2008, pp. 1-238, Retrieved from the Internet: http://www.cisco.com/en/US/docs/nsite/enterprise/wan/wanoptimization/wan_opt_sg.pdf.
CN First Office Action for application No. 201180049247.7 dated Mar. 27, 2015, 8 pages.
EP Examination Report for Application No. 11751719.3 dated Jan. 13, 2015.
Geza Szabo et al: "Accurate Traffic Classification", World of Wireless, Mobile and Multimedia Networks, 2007. WOWMOM 2007. IEEE International Symposium on a, IEEE, PI, Jun. 1, 2007 (Jun. 1, 2007), pp. 1-8, XP031149164, ISBN: 978-1-4244-0992-1 abstract p. 3, paragraph 2.
International Preliminary Report on Patentability issued Feb. 21, 2013 in PCT/US2011/047439.
International Preliminary Report on Patentability issued Feb. 21, 2013 in PCT/US2011/047444.
International Preliminary Report on Patentability issued Feb. 21,2013 in PCT Application No. PCT/US2011/047449.
International Search Report issued Oct. 28, 2011 in PCT/US2011/047439.
International Search Report on PCT/US2011/047444 dated Nov. 11, 2011.
International Search Report on PCT/US2011/047449 dated Jan. 30, 2012.
Moore A W et al. "Toward the Accurate Ideintification of Network Applications", Lecture Notes in Computer Science, Springer Verlag, Berlin, Germany. vol. 3431, Jan. 1, 2005, pp. 41-54.
US Notice of Allowance for U.S. Appl. No. 14/192,556 dated Feb. 3, 2015.
US Notice of Allowance for U.S. Appl. No. 12/855,324 dated Nov. 22, 2013.
US Notice of Allowance for U.S. Appl. No. 12/855,324 dated Apr. 1, 2014.
US Notice of Allowance for U.S. Appl. No. 12/855,327 dated Nov. 19, 2014.
US Notice of Allowance for U.S. Appl. No. 12/855,335 dated Sep. 26, 2013.
US Office Action for U.S. Appl. No. 12/855,335 dated Apr. 30, 2012.
US Office Action in U.S. Appl. No. 12/855,324 dated Jan. 7, 2013.
US Office Action in U.S. Appl. No. 12/855,324 dated Jul. 30, 2013.
US Office Action in U.S. Appl. No. 12/855,327 DTD Jan. 30, 2013.
US Office Action in U.S. Appl. No. 12/855,327 dated Jul. 31, 2012.
US Office Action on U.S. Appl. No. 12/855,335 dated Aug. 6, 2012.
US Office Action on U.S. Appl. No. 14/192,556 dated Oct. 10, 2014.
US Office Action on for U.S. Appl. No. 14/143,588 DTD Apr. 23, 2015.
Written Opinion issued Oct. 28, 2011 in PCT/US2011/047439.
Written Opinion on PCT/US2011/047444 dated Nov. 11, 2011.
Written Opinion on PCT/US2011/047449 dated Jan. 30, 2012.
English translation of Second Chinese Office Action on CN Application No. 2011800492477 dated Nov. 23, 2015.
English Translation of the 1st Chinese Office Action for 201180049205.3 dated Apr. 3, 2015.
English Translation of the Second Chinese Office Action on CN Application No. 201180049205 issued Dec. 4, 2015.
European Exam Report 94(3) on 11751719.3 mailed Jul. 20, 2015.
US Notice of Allowance on U.S. Appl. No. 14/143,588 dated Nov. 10, 2015.
European Exam Report pursuant to Article 94(3) EPC on EP 11754775.2 dated Jan. 13, 2016.
Examination Report for European Patent Application No. 11754776.0 mailed Oct. 11, 2016.

* cited by examiner

SYSTEMS AND METHODS FOR QUALITY OF SERVICE OF ICA PUBLISHED APPLICATIONS

RELATED APPLICATION

This application is a continuation of and claims priority to and the benefit of, U.S. Non-provisional application Ser. No. 12/855,327, entitled "Systems And Methods For Quality of Service of ICA Published Applications", filed on Aug. 12, 2010, and which is incorporated herein by reference in its entirety for all purposes.

FIELD OF THE INVENTION

The present invention generally relates to data communication networks. In particular, the present invention relates to systems and methods for providing discovery of applications for classification of a network packet for performing QoS and acceleration techniques.

BACKGROUND OF THE INVENTION

In many enterprise network environments, a large number of users may execute various local and remote applications and interact with other clients, servers, and intermediary devices. These applications and interactions may utilize a variety of communications protocols. In some instances, multiple applications or services may utilize the same communication protocols despite transmitting data with different performance requirements. In other instances, communications may be encrypted, compressed, or otherwise altered. Due to these and other characteristics, it may be difficult to classify and prioritize these communications for performing or utilizing various quality of service (QoS) techniques or mechanisms.

BRIEF SUMMARY OF THE INVENTION

The present invention is directed towards systems and methods for providing discovery of applications for classification of a network packet for performing QoS and acceleration techniques. Remote display protocol traffic associated with a new application not previously included in a list of predetermined applications may be parsed for application information, and the new application may be added to the application list. The remote display protocol traffic may then be classified according to the new application, and network performance may be enhanced and optimized by providing QoS and acceleration engines with packet- or data-specific information corresponding to the newly identified application.

In one aspect, the present invention features a method for discovery of applications via a remote display protocol to include in a list of applications for classification of network traffic. The method includes a device intermediary to a plurality of clients and a plurality of servers classifying remote display protocol traffic according to a list of applications for the remote display protocol. The method also includes the device parsing application information of the remote display protocol from the remote display protocol traffic traversing the device. The method further includes the device identifying a new application not in the list of applications for the remote display protocol from the parsed application information. The method also includes the device adding the new application to the list of applications used for classification of remote display protocol traffic.

In one embodiment, the method includes the device establishing the list of applications for the remote display protocol during initialization of the device. In another embodiment, the method includes the device establishing the list of applications as applications published by a server for the remote display protocol. In some embodiments, the method includes a server publishing the new application as an application accessible on the server by one or more users via the remote display protocol.

In one embodiment, the method includes comparing a name of the new application from the parsed application information with names from the list of applications. In another embodiment, the method includes determining that parsed application information of the remote display protocol identifies an application as the new application.

In some embodiments, the method includes establishing an application identifier for the new application. In other embodiments, the method includes establishing a priority for the new application from a plurality of priorities. In a further embodiment, the method includes the device receiving remote display protocol traffic for the new application and classifying the remote display protocol traffic according to the priority. In yet other embodiments, the method includes the device receiving remote display protocol traffic for the new application and classifying the remote display protocol traffic according to classification information for the new application added to the list of applications.

In another aspect, the present invention features a system for discovery of applications via a remote display protocol to include in a list of applications for classification of network traffic. The system includes a device intermediary to a plurality of clients and a plurality of servers. The system also includes a classifier of the device classifying remote display protocol traffic according to a list of applications for the remote display protocol. The system further includes a parser parsing application information of the remote display protocol from the remote display protocol traffic traversing the device and identifying, from the parsed application information, a new application not in the list of applications for the remote display protocol. The system also includes the device adding the new application to the list of applications used by the classifier for classification of remote display protocol traffic.

In some embodiments, the system includes the device establishing the list of applications for the remote display protocol during initialization of the device. In other embodiments, the system includes the device establishing the list of applications as applications published by a server for the remote display protocol. In one embodiment, the system includes a server publishing the new application as an application accessible on the server by one or more users via the remote display protocol.

In one embodiment, the system includes the parser comparing a name of the new application from the parsed application information with names from the list of applications. In another embodiment, the system includes the parser determining that parsed application information of the remote display protocol identifies an application as the new application. In yet another embodiment, the system includes the device establishing an application identifier for the new application. In yet still another embodiment, the system includes the device establishing a priority for the new application from a plurality of priorities. In a further embodiment, the system includes the device receiving remote display protocol traffic for the new application and classifying the remote display protocol traffic according to the priority. In another embodiment, the system includes the device receiving remote display protocol traffic for the new application and classifying the remote display protocol traffic according to classification information for the new application added to the list of applications.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
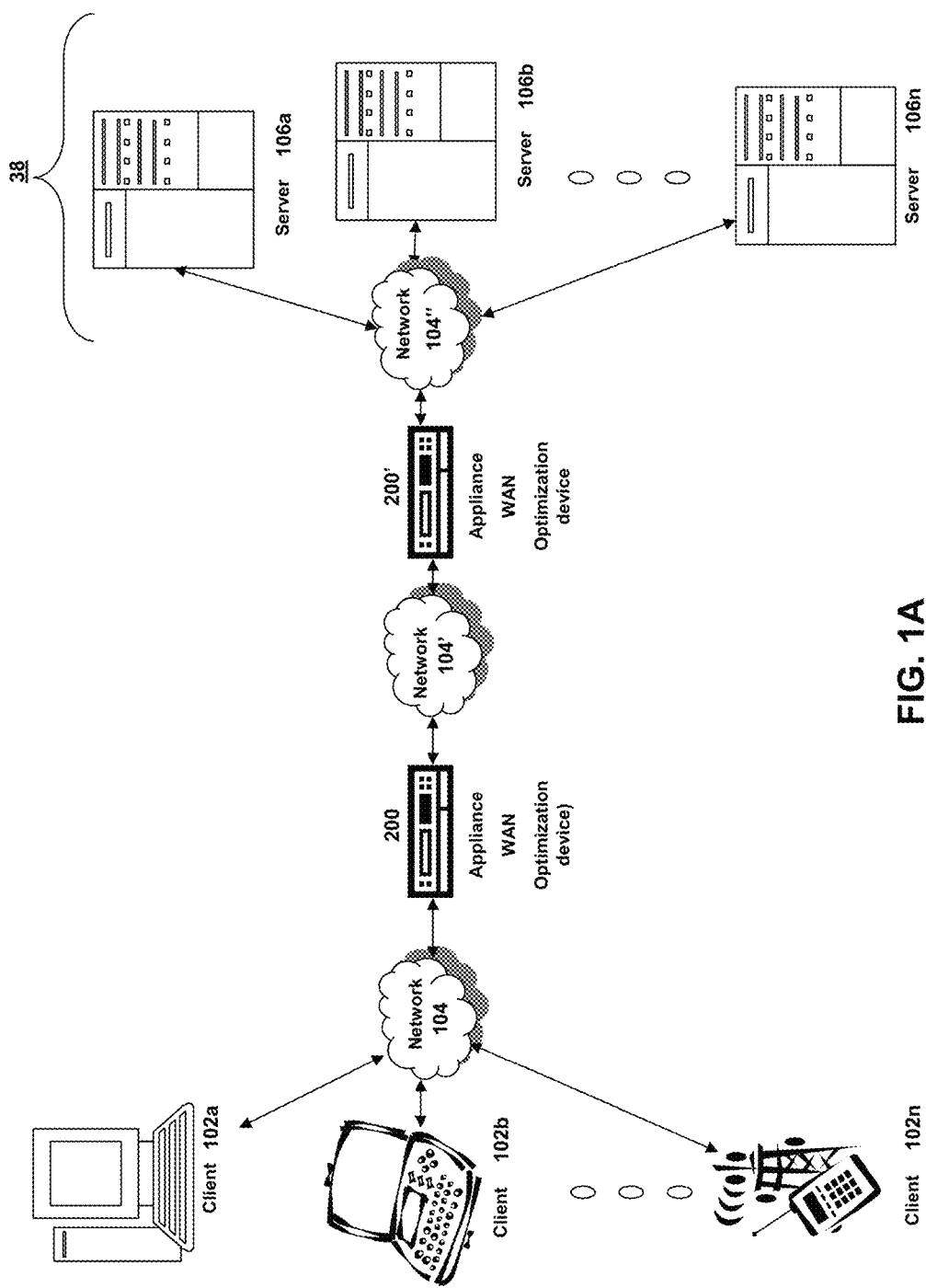
FIG. 1A is a block diagram of an embodiment of a network environment for a client to access a server via one or more network optimization appliances.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server; and Section D describes embodiments of systems and methods for classifying network packets.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment has one or more clients 102a-102n (also generally referred to as local machine(s) 102, or client(s) 102) in communication with one or more servers 106a-106n (also generally referred to as server(s) 106, or remote machine(s) 106) via one or more networks 104, 104', 104". In some embodiments, a client 102 communicates with a server 106 via one or more network optimization appliances 200, 200' (generally referred to as appliance 200). In one embodiment, the network optimization appliance 200 is designed, configured or adapted to optimize Wide Area Network (WAN) network traffic. In some embodiments, a first appliance 200 works in conjunction or cooperation with a second appliance 200' to optimize network traffic. For example, a first appliance 200 may be located between a branch office and a WAN connection while the second appliance 200' is located between the WAN and a corporate Local Area Network (LAN). The appliances 200 and 200' may work together to optimize the WAN related network traffic between a client in the branch office and a server on the corporate LAN.

Although FIG. 1A shows a network 104, network 104' and network 104" (generally referred to as network(s) 104) between the clients 102 and the servers 106, the clients 102 and the servers 106 may be on the same network 104. The networks 104, 104', 104" can be the same type of network or different types of networks. The network 104 can be a local-area network (LAN), such as a company Intranet, a metropolitan area network (MAN), or a wide area network (WAN), such as the Internet or the World Wide Web. The networks 104, 104', 104" can be a private or public network. In one embodiment, network 104' or network 104" may be a private network and network 104 may be a public network. In some embodiments, network 104 may be a private network and network 104' and/or network 104" a public network. In another embodiment, networks 104, 104', 104" may be private networks. In some embodiments, clients 102 may be located at a branch office of a corporate enterprise communicating via a WAN connection over the network 104 to the servers 106 located on a corporate LAN in a corporate data center.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

As depicted in FIG. 1A, a first network optimization appliance 200 is shown between networks 104 and 104' and a second network optimization appliance 200' is also between networks 104' and 104". In some embodiments, the appliance 200 may be located on network 104. For example, a corporate enterprise may deploy an appliance 200 at the branch office. In other embodiments, the appliance 200 may be located on network 104'. In some embodiments, the appliance 200' may be located on network 104' or network 104". For example, an appliance 200 may be located at a corporate data center. In one embodiment, the appliance 200 and 200' are on the same network. In another embodiment, the appliance 200 and 200' are on different networks.

In one embodiment, the appliance 200 is a device for accelerating, optimizing or otherwise improving the performance, operation, or quality of service of any type and form of network traffic. In some embodiments, the appliance 200 is a performance enhancing proxy. In other embodiments, the appliance 200 is any type and form of WAN optimization or acceleration device, sometimes also referred to as a WAN optimization controller. In one embodiment, the appliance 200 is any of the product embodiments referred to as WANScaler manufactured by Citrix Systems, Inc. of Ft. Lauderdale, Fla. In other embodiments, the appliance 200 includes any of the product embodiments referred to as BIG-IP link controller and WANjet manufactured by F5 Networks, Inc. of Seattle, Wash. In another embodiment, the appliance 200 includes any of the WX and WXC WAN acceleration device platforms manufactured by Juniper Networks, Inc. of Sunnyvale, Calif. In some embodiments, the appliance 200 includes any of the steelhead line of WAN optimization appliances manufactured by Riverbed Technology of San Francisco, Calif. In other embodiments, the appliance 200 includes any of the WAN related devices manufactured by Expand Networks Inc. of Roseland, N.J. In one embodiment, the appliance 200 includes any of the WAN related appliances manufactured by Packeteer Inc. of Cupertino, Calif., such as the PacketShaper, iShared, and SkyX product embodiments provided by Packeteer. In yet another embodiment, the appliance 200 includes any WAN related appliances and/or software manufactured by Cisco Systems, Inc. of San Jose, Calif., such as the Cisco Wide Area Network Application Services software and network modules, and Wide Area Network engine appliances.

In some embodiments, the appliance 200 provides application and data acceleration services for branch-office or remote offices. In one embodiment, the appliance 200 includes optimization of Wide Area File Services (WAFS). In another embodiment, the appliance 200 accelerates the delivery of files, such as via the Common Internet File System (CIFS) protocol. In other embodiments, the appliance 200 provides caching in memory and/or storage to accelerate delivery of applications and data. In one embodiment, the appliance 205 provides compression of network traffic at any level of the network stack or at any protocol or network layer. In another embodiment, the appliance 200 provides transport layer protocol optimizations, flow control, performance enhancements or modifications and/or management to accelerate delivery of applications and data over a WAN connection. For example, in one embodiment, the appliance 200 provides Transport Control Protocol (TCP) optimizations. In other embodiments, the appliance 200 provides optimizations, flow control, performance enhancements or modifications and/or management for any session or application layer protocol. Further details of the optimization techniques, operations and architecture of the appliance 200 are discussed below in Section B.

Still referring to FIG. 1A, the network environment may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Deployed with Other Appliances.

Figure 1B:
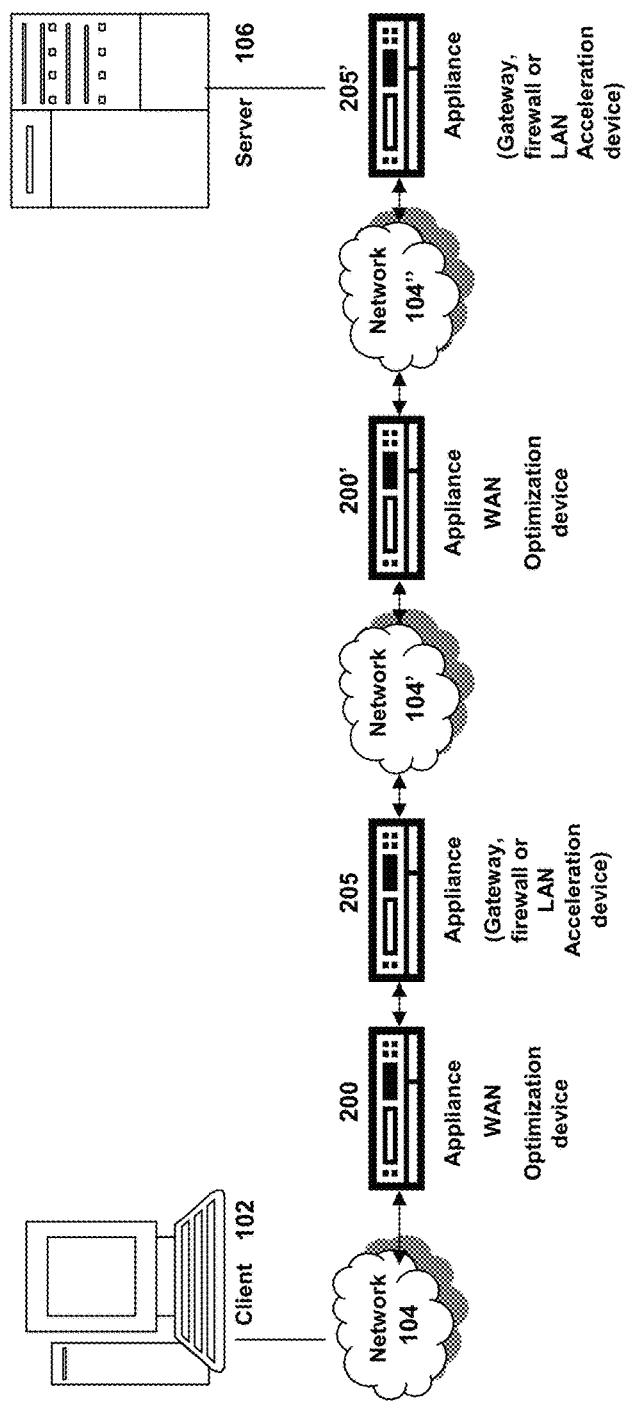
FIG. 1B is a block diagram of another embodiment of a network environment for a client to access a server via one or more network optimization appliances in conjunction with other network appliances.

Referring now to FIG. 1B, another embodiment of a network environment is depicted in which the network optimization appliance 200 is deployed with one or more other appliances 205, 205' (generally referred to as appliance 205 or second appliance 205) such as a gateway, firewall or acceleration appliance. For example, in one embodiment, the appliance 205 is a firewall or security appliance while appliance 205' is a LAN acceleration device. In some embodiments, a client 102 may communicate to a server 106 via one or more of the first appliances 200 and one or more second appliances 205.

One or more appliances 200 and 205 may be located at any point in the network or network communications path between a client 102 and a server 106. In some embodiments, a second appliance 205 may be located on the same network 104 as the first appliance 200. In other embodiments, the second appliance 205 may be located on a different network 104 as the first appliance 200. In yet another embodiment, a first appliance 200 and second appliance 205 is on the same network, for example network 104, while the first appliance 200' and second appliance 205' is on the same network, such as network 104".

In one embodiment, the second appliance 205 includes any type and form of transport control protocol or transport later terminating device, such as a gateway or firewall device. In one embodiment, the appliance 205 terminates the transport control protocol by establishing a first transport control protocol connection with the client and a second transport control connection with the second appliance or server. In another embodiment, the appliance 205 terminates the transport control protocol by changing, managing or controlling the behavior of the transport control protocol connection between the client and the server or second appliance. For example, the appliance 205 may change, queue, forward or transmit network packets in manner to effectively terminate the transport control protocol connection or to act or simulate as terminating the connection.

In some embodiments, the second appliance 205 is a performance enhancing proxy. In one embodiment, the appliance 205 provides a virtual private network (VPN) connection. In some embodiments, the appliance 205 provides a Secure Socket Layer VPN (SSL VPN) connection. In other embodiments, the appliance 205 provides an IPsec (Internet Protocol Security) based VPN connection. In some embodiments, the appliance 205 provides any one or more of the following functionality: compression, acceleration, load-balancing, switching/routing, caching, and Transport Control Protocol (TCP) acceleration.

In one embodiment, the appliance 205 is any of the product embodiments referred to as Access Gateway, Application Firewall, Application Gateway, or NetScaler manufactured by Citrix Systems, Inc. of Ft. Lauderdale, Fla. As such, in some embodiments, the appliance 205 includes any logic, functions, rules, or operations to perform services or functionality such as SSL VPN connectivity, SSL offloading, switching/load balancing, Domain Name Service resolution, LAN acceleration and an application firewall.

In some embodiments, the appliance 205 provides a SSL VPN connection between a client 102 and a server 106. For example, a client 102 on a first network 104 requests to establish a connection to a server 106 on a second network 104'. In some embodiments, the second network 104" is not routable from the first network 104. In other embodiments, the client 102 is on a public network 104 and the server 106 is on a private network 104', such as a corporate network. In one embodiment, a client agent intercepts communications of the client 102 on the first network 104, encrypts the communications, and transmits the communications via a first transport layer connection to the appliance 205. The appliance 205 associates the first transport layer connection on the first network 104 to a second transport layer connection to the server 106 on the second network 104. The appliance 205 receives the intercepted communication from the client agent, decrypts the communications, and transmits the communication to the server 106 on the second network 104 via the second transport layer connection. The second transport layer connection may be a pooled transport layer connection. In one embodiment—the appliance 205 provides an end-to-end secure transport layer connection for the client 102 between the two networks 104, 104'

In one embodiments, the appliance 205 hosts an intranet internet protocol or intranetIP address of the client 102 on the virtual private network 104. The client 102 has a local network identifier, such as an internet protocol (IP) address and/or host name on the first network 104. When connected to the second network 104' via the appliance 205, the appliance 205 establishes, assigns or otherwise provides an IntranetIP, which is network identifier, such as IP address and/or host name, for the client 102 on the second network 104'. The appliance 205 listens for and receives on the second or private network 104' for any communications directed towards the client 102 using the client's established IntranetIP. In one embodiment, the appliance 205 acts as or on behalf of the client 102 on the second private network 104.

In some embodiment, the appliance 205 has an encryption engine providing logic, business rules, functions or operations for handling the processing of any security related protocol, such as SSL or TLS, or any function related thereto. For example, the encryption engine encrypts and decrypts network packets, or any portion thereof, communicated via the appliance 205. The encryption engine may also setup or establish SSL or TLS connections on behalf of the client 102a-102n, server 106a-106n, or appliance 200, 205. As such, the encryption engine provides offloading and acceleration of SSL processing. In one embodiment, the encryption engine uses a tunneling protocol to provide a virtual private network between a client 102a-102n and a server 106a-106n. In some embodiments, the encryption engine uses an encryption processor. In other embodiments, the encryption engine includes executable instructions running on an encryption processor.

In some embodiments, the appliance 205 provides one or more of the following acceleration techniques to communications between the client 102 and server 106: 1) compression, 2) decompression, 3) Transmission Control Protocol pooling, 4) Transmission Control Protocol multiplexing, 5) Transmission Control Protocol buffering, and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 205 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 205, and the destination network address is changed to that of the intended server. In the case of an outbound packet (that is, one received from a server 106), the source network address is changed from that of the server 106 to that of an output port of appliance 205 and the destination address is changed from that of appliance 205 to that of the requesting client 102. The sequence numbers and acknowledgment numbers of the packet are also translated to sequence numbers and acknowledgement expected by the client 102 on the appliance's 205 transport layer connection to the client 102. In some embodiments, the packet checksum of the transport layer protocol is recalculated to account for these translations.

In another embodiment, the appliance 205 provides switching or load-balancing functionality for communications between the client 102 and server 106. In some embodiments, the appliance 205 distributes traffic and directs client requests to a server 106 based on layer 4 payload or application-layer request data. In one embodiment, although the network layer or layer 2 of the network packet identifies a destination server 106, the appliance 205 determines the server 106 to distribute the network packet by application information and data carried as payload of the transport layer packet. In one embodiment, a health monitoring program of the appliance 205 monitors the health of servers to determine the server 106 for which to distribute a client's request. In some embodiments, if the appliance 205 detects a server 106 is not available or has a load over a predetermined threshold, the appliance 205 can direct or distribute client requests to another server 106.

In some embodiments, the appliance 205 acts as a Domain Name Service (DNS) resolver or otherwise provides resolution of a DNS request from clients 102. In some embodiments, the appliance intercepts' a DNS request transmitted by the client 102. In one embodiment, the appliance 205 responds to a client's DNS request with an IP address of or hosted by the appliance 205. In this embodiment, the client 102 transmits network communication for the domain name to the appliance 200. In another embodiment, the appliance 200 responds to a client's DNS request with an IP address of or hosted by a second appliance 200'. In some embodiments, the appliance 205 responds to a client's DNS request with an IP address of a server 106 determined by the appliance 200.

In yet another embodiment, the appliance 205 provides application firewall functionality for communications between the client 102 and server 106. In one embodiment, a policy engine 295' provides rules for detecting and blocking illegitimate requests. In some embodiments, the application firewall protects against denial of service (DoS) attacks. In other embodiments, the appliance inspects the content of intercepted requests to identify and block application-based attacks. In some embodiments, the rules/policy engine includes one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall of the appliance provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall of the appliance 205 ensures cookies are not modified. In other embodiments, the appliance 205 protects against forceful browsing by enforcing legal URLs.

In still yet other embodiments, the application firewall appliance 205 protects any confidential information contained in the network communication. The appliance 205 may inspect or analyze any network communication in accordance with the rules or polices of the policy engine to identify any confidential information in any field of the network packet. In some embodiments, the application firewall identifies in the network communication one or more occurrences of a credit card number, password, social security number, name, patient code, contact information, and age. The encoded portion of the network communication may include these occurrences or the confidential information. Based on these occurrences, in one embodiment, the application firewall may take a policy action on the network communication, such as prevent transmission of the network communication. In another embodiment, the application firewall may rewrite, remove or otherwise mask such identified occurrence or confidential information.

Although generally referred to as a network optimization or first appliance 200 and a second appliance 205, the first appliance 200 and second appliance 205 may be the same type and form of appliance. In one embodiment, the second appliance 205 may perform the same functionality, or portion thereof, as the first appliance 200, and vice-versa. For example, the first appliance 200 and second appliance 205 may both provide acceleration techniques. In one embodiment, the first appliance may perform LAN acceleration while the second appliance performs WAN acceleration, or vice-versa. In another example, the first appliance 200 may also be a transport control protocol terminating device as with the second appliance 205. Furthermore, although appliances 200 and 205 are shown as separate devices on the network, the appliance 200 and/or 205 could be a part of any client 102 or server 106.

Figure 1C:
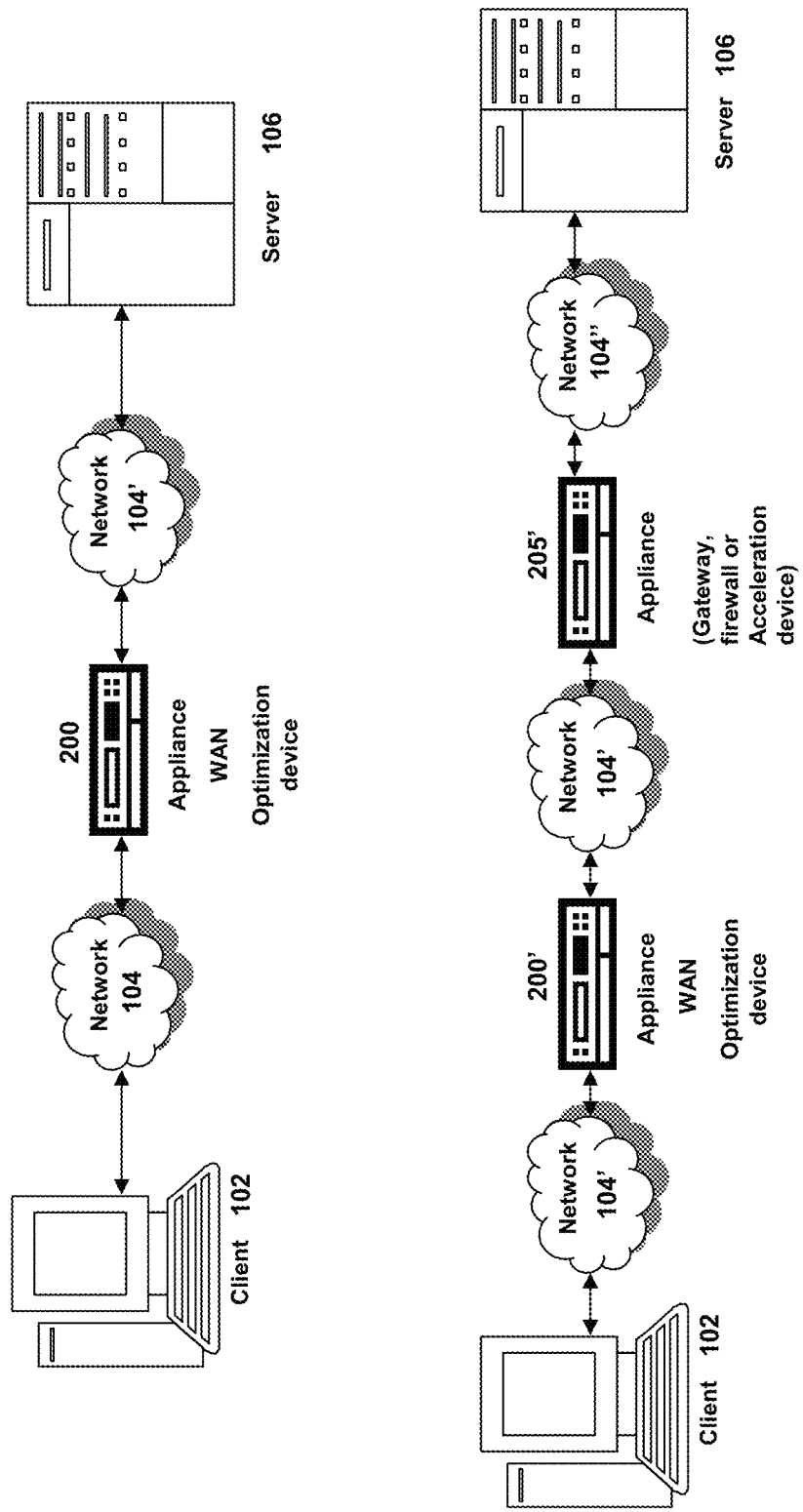
FIG. 1C is a block diagram of another embodiment of a network environment for a client to access a server via a single network optimization appliance deployed stand-alone or in conjunction with other network appliances.

Referring now to FIG. 1C, other embodiments of a network environment for deploying the appliance 200 are depicted. In another embodiment as depicted on the top of FIG. 1C, the appliance 200 may be deployed as a single appliance or single proxy on the network 104. For example, the appliance 200 may be designed, constructed or adapted to perform WAN optimization techniques discussed herein without a second cooperating appliance 200'. In other embodiments as depicted on the bottom of FIG. 1C, a single appliance 200 may be deployed with one or more second appliances 205. For example, a WAN acceleration first appliance 200, such as a Citrix WANScaler appliance, may be deployed with a LAN accelerating or Application Firewall second appliance 205, such as a Citrix NetScaler appliance.

Computing Device

Figure 1D:
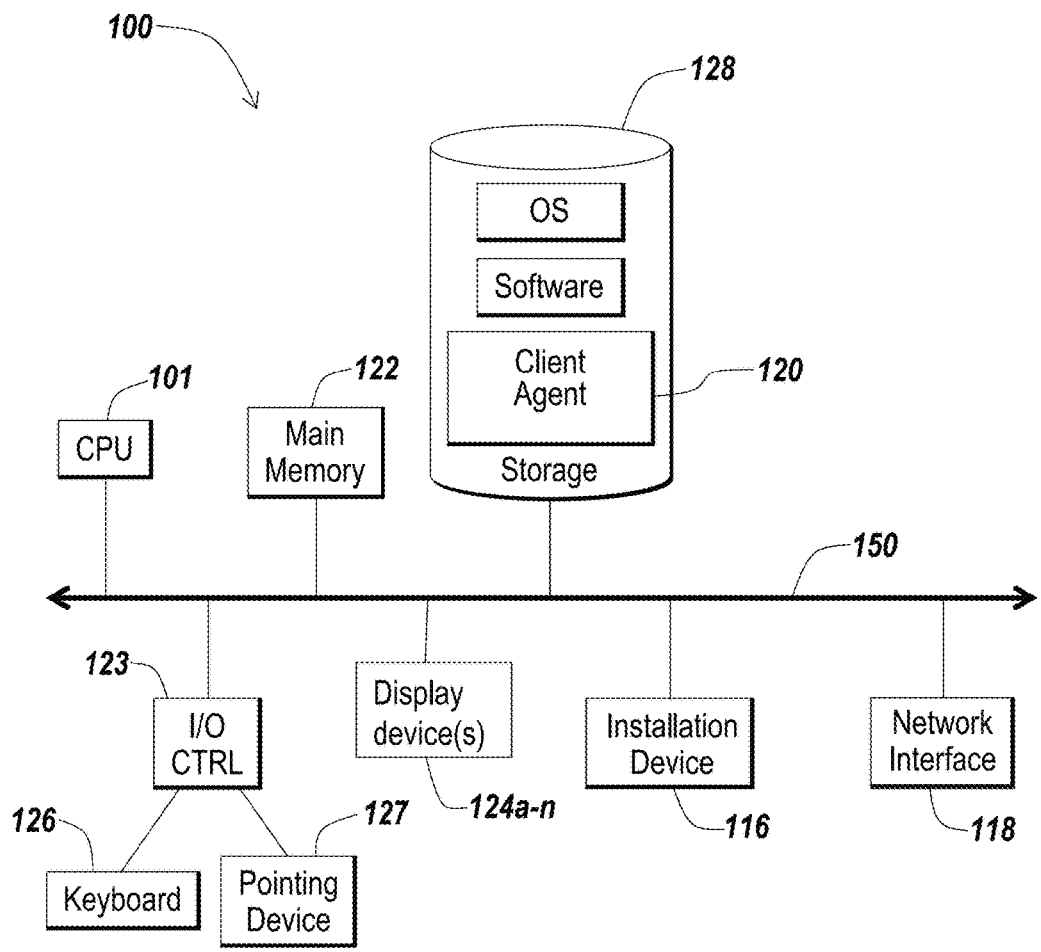
FIGS. 1D and 1E are block diagrams of embodiments of a computing device.

The client 102, server 106, and appliance 200 and 205 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. System and Appliance Architecture

Figure 2A:
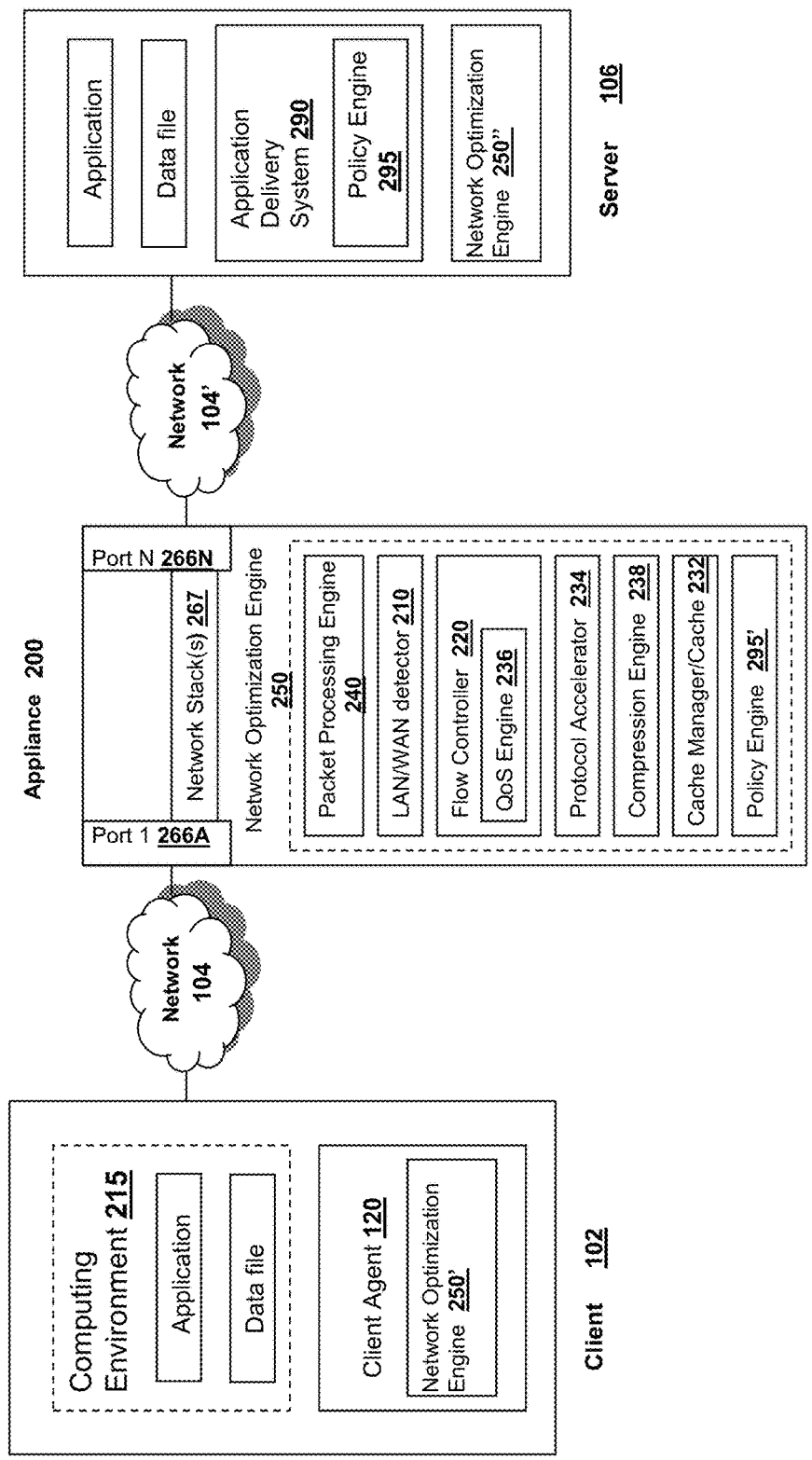
FIG. 2A is a block diagram of an embodiment of an appliance for processing communications between a client and a server.

Referring now to FIG. 2A, an embodiment of a system environment and architecture of an appliance 200 for delivering and/or operating a computing environment on a client is depicted. In some embodiments, a server 106 includes an application delivery system 290 for delivering a computing environment or an application and/or data file to one or more clients 102. In brief overview, a client 102 is in communication with a server 106 via network 104 and appliance 200. For example, the client 102 may reside in a remote office of a company, e.g., a branch office, and the server 106 may reside at a corporate data center. The client 102 has a client agent 120, and a computing environment 215. The computing environment 215 may execute or operate an application that accesses, processes or uses a data file. The computing environment 215, application and/or data file may be delivered via the appliance 200 and/or the server 106.

In some embodiments, the appliance 200 accelerates delivery of a computing environment 215, or any portion thereof, to a client 102. In one embodiment, the appliance 200 accelerates the delivery of the computing environment 215 by the application delivery system 290. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. In another embodiment, the appliance 200 controls, manages, or adjusts the transport layer protocol to accelerate delivery of the computing environment. In some embodiments, the appliance 200 uses caching and/or compression techniques to accelerate delivery of a computing environment.

In some embodiments, the application delivery management system 290 provides application delivery techniques to deliver a computing environment to a desktop of a user, remote or otherwise, based on a plurality of execution methods and based on any authentication and authorization policies applied via a policy engine 295. With these techniques, a remote user may obtain a computing environment and access to server stored applications and data files from any network connected device 100. In one embodiment, the application delivery system 290 may reside or execute on a server 106. In another embodiment, the application delivery system 290 may reside or execute on a plurality of servers 106a-106n. In some embodiments, the application delivery system 290 may execute in a server farm 38. In one embodiment, the server 106 executing the application delivery system 290 may also store or provide the application and data file. In another embodiment, a first set of one or more servers 106 may execute the application delivery system 290, and a different server 106n may store or provide the application and data file. In some embodiments, each of the application delivery system 290, the application, and data file may reside or be located on different servers. In yet another embodiment, any portion of the application delivery system 290 may reside, execute or be stored on or distributed to the appliance 200, or a plurality of appliances.

The client 102 may include a computing environment 215 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 290 and/or server 106 may deliver the application and data file to the client 102. For example, in one embodiment, the server 106 may transmit the application as an application stream to operate in computing environment 215 on client 102.

In some embodiments, the application delivery system 290 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 290 may deliver one or more applications to clients 102 or users via a remote-display protocol or otherwise via remote-based or server-based computing. In another embodiment, the application delivery system 290 may deliver one or more applications to clients or users via steaming of the application.

In one embodiment, the application delivery system 290 includes a policy engine 295 for controlling and managing the access to, selection of application execution methods and the delivery of applications. In some embodiments, the policy engine 295 determines the one or more applications a user or client 102 may access. In another embodiment, the policy engine 295 determines how the application should be delivered to the user or client 102, e.g., the method of execution. In some embodiments, the application delivery system 290 provides a plurality of delivery techniques from which to select a method of application execution, such as a server-based computing, streaming or delivering the application locally to the client 120 for local execution.

In one embodiment, a client 102 requests execution of an application program and the application delivery system 290 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 290 enumerates a plurality of application programs available to the client 102. The application delivery system 290 receives a request to execute an enumerated application. The application delivery system 290 selects one of a predetermined number of methods for executing the enumerated application, for example, responsive to a policy of a policy engine. The application delivery system 290 may select a method of execution of the application enabling the client 102 to receive application-output data generated by execution of the application program on a server 106. The application delivery system 290 may select a method of execution of the application enabling the client or local machine 102 to execute the application program locally after retrieving a plurality of application files comprising the application. In yet another embodiment, the application delivery system 290 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiment the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Example Appliance Architecture

Figure 1E:
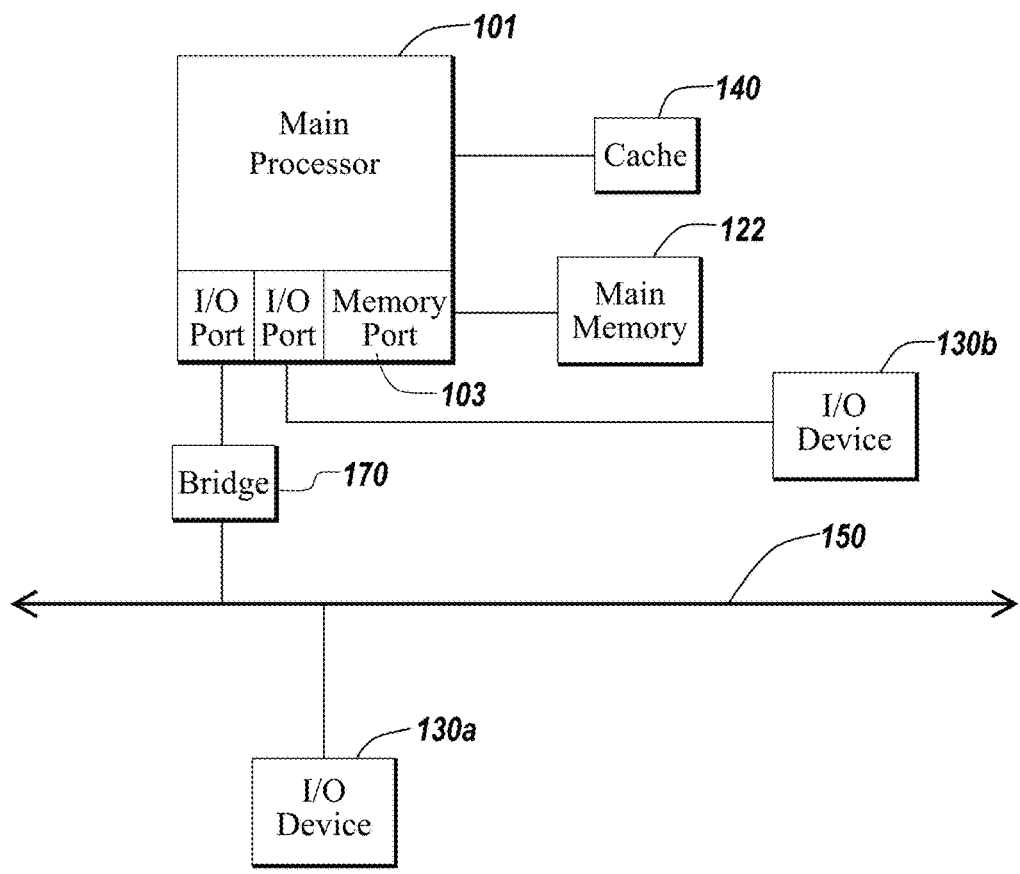

FIG. 2A also illustrates an example embodiment of the appliance 200. The architecture of the appliance 200 in FIG. 2A is provided by way of illustration only and is not intended to be limiting in any manner. The appliance 200 may include any type and form of computing device 100, such as any element or portion described in conjunction with FIGS. 1D and 1E above. In brief overview, the appliance 200 has one or more network ports 266A-226N and one or more networks stacks 267A-267N for receiving and/or transmitting communications via networks 104. The appliance 200 also has a network optimization engine 250 for optimizing, accelerating or otherwise improving the performance, operation, or quality of any network traffic or communications traversing the appliance 200.

The appliance 200 includes or is under the control of an operating system. The operating system of the appliance 200 may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The operating system of appliance 200 allocates, manages, or otherwise segregates the available system memory into what is referred to as kernel or system space, and user or application space. The kernel space is typically reserved for running the kernel, including any device drivers, kernel extensions or other kernel related software. As known to those skilled in the art, the kernel is the core of the operating system, and provides access, control, and management of resources and hardware-related elements of the appliance 200. In accordance with an embodiment of the appliance 200, the kernel space also includes a number of network services or processes working in conjunction with the network optimization engine 250, or any portion thereof. Additionally, the embodiment of the kernel will depend on the embodiment of the operating system installed, configured, or otherwise used by the device 200. In contrast to kernel space, user space is the memory area or portion of the operating system used by user mode applications or programs otherwise running in user mode. A user mode application may not access kernel space directly and uses service calls in order to access kernel services. The operating system uses the user or application space for executing or running applications and provisioning of user level programs, services, processes and/or tasks.

The appliance 200 has one or more network ports 266 for transmitting and receiving data over a network 104. The network port 266 provides a physical and/or logical interface between the computing device and a network 104 or another device 100 for transmitting and receiving network communications. The type and form of network port 266 depends on the type and form of network and type of medium for connecting to the network. Furthermore, any software of, provisioned for or used by the network port 266 and network stack 267 may run in either kernel space or user space.

In one embodiment, the appliance 200 has one network stack 267, such as a TCP/IP based stack, for communicating on a network 105, such with the client 102 and/or the server 106. In one embodiment, the network stack 267 is used to communicate with a first network, such as network 104, and also with a second network 104'. In another embodiment, the appliance 200 has two or more network stacks, such as first network stack 267A and a second network stack 267N. The first network stack 267A may be used in conjunction with a first port 266A to communicate on a first network 104. The second network stack 267N may be used in conjunction with a second port 266N to communicate on a second network 104'. In one embodiment, the network stack(s) 267 has one or more buffers for queuing one or more network packets for transmission by the appliance 200.

The network stack 267 includes any type and form of software, or hardware, or any combinations thereof, for providing connectivity to and communications with a network. In one embodiment, the network stack 267 includes a software implementation for a network protocol suite. The network stack 267 may have one or more network layers, such as any networks layers of the Open Systems Interconnection (OSI) communications model as those skilled in the art recognize and appreciate. As such, the network stack 267 may have any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 267 includes a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 267 has any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 267 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 267, such as for voice communications or real-time data communications.

Furthermore, the network stack 267 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 267 may be customized, modified or adapted to provide a custom or modified portion of the network stack 267 in support of any of the techniques described herein.

In one embodiment, the appliance 200 provides for or maintains a transport layer connection between a client 102 and server 106 using a single network stack 267. In some embodiments, the appliance 200 effectively terminates the transport layer connection by changing, managing or controlling the behavior of the transport control protocol connection between the client and the server. In these embodiments, the appliance 200 may use a single network stack 267. In other embodiments, the appliance 200 terminates a first transport layer connection, such as a TCP connection of a client 102, and establishes a second transport layer connection to a server 106 for use by or on behalf of the client 102, e.g., the second transport layer connection is terminated at the appliance 200 and the server 106. The first and second transport layer connections may be established via a single network stack 267. In other embodiments, the appliance 200 may use multiple network stacks, for example 267A and 267N. In these embodiments, the first transport layer connection may be established or terminated at one network stack 267A, and the second transport layer connection may be established or terminated on the second network stack 267N. For example, one network stack may be for receiving and transmitting network packets on a first network, and another network stack for receiving and transmitting network packets on a second network.

As shown in FIG. 2A, the network optimization engine 250 includes one or more of the following elements, components or modules: network packet processing engine 240, LAN/WAN detector 210, flow controller 220, QoS engine 236, protocol accelerator 234, compression engine 238, cache manager 232 and policy engine 295'. The network optimization engine 250, or any portion thereof, may include software, hardware or any combination of software and hardware. Furthermore, any software of, provisioned for or used by the network optimization engine 250 may run in either kernel space or user space. For example, in one embodiment, the network optimization engine 250 may run in kernel space. In another embodiment, the network optimization engine 250 may run in user space. In yet another embodiment, a first portion of the network optimization engine 250 runs in kernel space while a second portion of the network optimization engine 250 runs in user space.

Network Packet Processing Engine

The network packet engine 240, also generally referred to as a packet processing engine or packet engine, is responsible for controlling and managing the processing of packets received and transmitted by appliance 200 via network ports 266 and network stack(s) 267. The network packet engine 240 may operate at any layer of the network stack 267. In one embodiment, the network packet engine 240 operates at layer 2 or layer 3 of the network stack 267. In some embodiments, the packet engine 240 intercepts or otherwise receives packets at the network layer, such as the IP layer in a TCP/IP embodiment. In another embodiment, the packet engine 240 operates at layer 4 of the network stack 267. For example, in some embodiments, the packet engine 240 intercepts or otherwise receives packets at the transport layer, such as intercepting packets as the TCP layer in a TCP/IP embodiment. In other embodiments, the packet engine 240 operates at any session or application layer above layer 4. For example, in one embodiment, the packet engine 240 intercepts or otherwise receives network packets above the transport layer protocol layer, such as the payload of a TCP packet in a TCP embodiment.

The packet engine 240 may include a buffer for queuing one or more network packets during processing, such as for receipt of a network packet or transmission of a network packet. Additionally, the packet engine 240 is in communication with one or more network stacks 267 to send and receive network packets via network ports 266. The packet engine 240 may include a packet processing timer. In one embodiment, the packet processing timer provides one or more time intervals to trigger the processing of incoming, i.e., received, or outgoing, i.e., transmitted, network packets. In some embodiments, the packet engine 240 processes network packets responsive to the timer. The packet processing timer provides any type and form of signal to the packet engine 240 to notify, trigger, or communicate a time related event, interval or occurrence. In many embodiments, the packet processing timer operates in the order of milliseconds, such as for example 100 ms, 50 ms, 25 ms, 10 ms, 5 ms or 1 ms.

During operations, the packet engine 240 may be interfaced, integrated or be in communication with any portion of the network optimization engine 250, such as the LAN/WAN detector 210, flow controller 220, QoS engine 236, protocol accelerator 234, compression engine 238, cache manager 232 and/or policy engine 295'. As such, any of the logic, functions, or operations of the LAN/WAN detector 210, flow controller 220, QoS engine 236, protocol accelerator 234, compression engine 238, cache manager 232 and policy engine 295' may be performed responsive to the packet processing timer and/or the packet engine 240. In some embodiments, any of the logic, functions, or operations of the encryption engine 234, cache manager 232, policy engine 236 and multi-protocol compression logic 238 may be performed at the granularity of time intervals provided via the packet processing timer, for example, at a time interval of less than or equal to 10 ms. For example, in one embodiment, the cache manager 232 may perform expiration of any cached objects responsive to the integrated packet engine 240 and/or the packet processing timer 242. In another embodiment, the expiry or invalidation time of a cached object can be set to the same order of granularity as the time interval of the packet processing timer, such as at every 10 ms.

Cache Manager

The cache manager 232 may include software, hardware or any combination of software and hardware to store data, information and objects to a cache in memory or storage, provide cache access, and control and manage the cache. The data, objects or content processed and stored by the cache manager 232 may include data in any format, such as a markup language, or any type of data communicated via any protocol. In some embodiments, the cache manager 232 duplicates original data stored elsewhere or data previously computed, generated or transmitted, in which the original data may require longer access time to fetch, compute or otherwise obtain relative to reading a cache memory or storage element. Once the data is stored in the cache, future use can be made by accessing the cached copy rather than refetching or recomputing the original data, thereby reducing the access time. In some embodiments, the cache may comprise a data object in memory of the appliance 200. In another embodiment, the cache may comprise any type and form of storage element of the appliance 200, such as a portion of a hard disk. In some embodiments, the processing unit of the device may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any caching techniques of the appliance 200. In some embodiments, the cache manager 232 may operate as an application, library, program, service, process, thread or task. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

Policy Engine

The policy engine 295' includes any logic, function or operations for providing and applying one or more policies or rules to the function, operation or configuration of any portion of the appliance 200. The policy engine 295' may include, for example, an intelligent statistical engine or other programmable application(s). In one embodiment, the policy engine 295 provides a configuration mechanism to allow a user to identify, specify, define or configure a policy for the network optimization engine 250, or any portion thereof. For example, the policy engine 295 may provide policies for what data to cache, when to cache the data, for whom to cache the data, when to expire an object in cache or refresh the cache. In other embodiments, the policy engine 236 may include any logic, rules, functions or operations to determine and provide access, control and management of objects, data or content being cached by the appliance 200 in addition to access, control and management of security, network traffic, network access, compression or any other function or operation performed by the appliance 200.

In some embodiments, the policy engine 295' provides and applies one or more policies based on any one or more of the following: a user, identification of the client, identification of the server, the type of connection, the time of the connection, the type of network, or the contents of the network traffic. In one embodiment, the policy engine 295' provides and applies a policy based on any field or header at any protocol layer of a network packet. In another embodiment, the the policy engine 295' provides and applies a policy based on any payload of a network packet. For example, in one embodiment, the policy engine 295' applies a policy based on identifying a certain portion of content of an application layer protocol carried as a payload of a transport layer packet. In another example, the policy engine 295' applies a policy based on any information identified by a client, server or user certificate. In yet another embodiment, the policy engine 295' applies a policy based on any attributes or characteristics obtained about a client 102, such as via any type and form of endpoint detection (see for example the collection agent of the client agent discussed below).

In one embodiment, the policy engine 295' works in conjunction or cooperation with the policy engine 295 of the application delivery system 290. In some embodiments, the policy engine 295' is a distributed portion of the policy engine 295 of the application delivery system 290. In another embodiment, the policy engine 295 of the application delivery system 290 is deployed on or executed on the appliance 200. In some embodiments, the policy engines 295, 295' both operate on the appliance 200. In yet another embodiment, the policy engine 295', or a portion thereof, of the appliance 200 operates on a server 106.

Multi-Protocol and Multi-Layer Compression Engine

The compression engine 238 includes any logic, business rules, function or operations for compressing one or more protocols of a network packet, such as any of the protocols used by the network stack 267 of the appliance 200. The compression engine 238 may also be referred to as a multi-protocol compression engine 238 in that it may be designed, constructed or capable of compressing a plurality of protocols. In one embodiment, the compression engine 238 applies context insensitive compression, which is compression applied to data without knowledge of the type of data. In another embodiment, the compression engine 238 applies context-sensitive compression. In this embodiment, the compression engine 238 utilizes knowledge of the data type to select a specific compression algorithm from a suite of suitable algorithms. In some embodiments, knowledge of the specific protocol is used to perform context-sensitive compression. In one embodiment, the appliance 200 or compression engine 238 can use port numbers (e.g., well-known ports), as well as data from the connection itself to determine the appropriate compression algorithm to use. Some protocols use only a single type of data, requiring only a single compression algorithm that can be selected when the connection is established. Other protocols contain different types of data at different times. For example, POP, IMAP, SMTP, and HTTP all move files of arbitrary types interspersed with other protocol data.

In one embodiment, the compression engine 238 uses a delta-type compression algorithm. In another embodiment, the compression engine 238 uses first site compression as well as searching for repeated patterns among data stored in cache, memory or disk. In some embodiments, the compression engine 238 uses a lossless compression algorithm. In other embodiments, the compression engine uses a lossy compression algorithm. In some cases, knowledge of the data type and, sometimes, permission from the user are required to use a lossy compression algorithm. Compression is not limited to the protocol payload. The control fields of the protocol itself may be compressed. In some embodiments, the compression engine 238 uses a different algorithm than that used for the payload.

In some embodiments, the compression engine 238 compresses at one or more layers of the network stack 267. In one embodiment, the compression engine 238 compresses at a transport layer protocol. In another embodiment, the compression engine 238 compresses at an application layer protocol. In some embodiments, the compression engine 238 compresses at a layer 2-4 protocol. In other embodiments, the compression engine 238 compresses at a layer 5-7 protocol. In yet another embodiment, the compression engine compresses a transport layer protocol and an application layer protocol. In some embodiments, the compression engine 238 compresses a layer 2-4 protocol and a layer 5-7 protocol.

In some embodiments, the compression engine 238 uses memory-based compression, cache-based compression or disk-based compression or any combination thereof. As such, the compression engine 238 may be referred to as a multi-layer compression engine. In one embodiment, the compression engine 238 uses a history of data stored in memory, such as RAM. In another embodiment, the compression engine 238 uses a history of data stored in a cache, such as L2 cache of the processor. In other embodiments, the compression engine 238 uses a history of data stored to a disk or storage location. In some embodiments, the compression engine 238 uses a hierarchy of cache-based, memory-based and disk-based data history. The compression engine 238 may first use the cache-based data to determine one or more data matches for compression, and then may check the memory-based data to determine one or more data matches for compression. In another case, the compression engine 238 may check disk storage for data matches for compression after checking either the cache-based and/or memory-based data history.

In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of HyperText Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine by integrating with packet processing engine 240 accessing the network stack 267 is able to compress any of the protocols carried by a transport layer protocol, such as any application layer protocol.

LAN/WAN Detector

The LAN/WAN detector 238 includes any logic, business rules, function or operations for automatically detecting a slow side connection (e.g., a wide area network (WAN) connection such as an Intranet) and associated port 267, and a fast side connection (e.g., a local area network (LAN) connection) and an associated port 267. In some embodiments, the LAN/WAN detector 238 monitors network traffic on the network ports 267 of the appliance 200 to detect a synchronization packet, sometimes referred to as a "tagged" network packet. The synchronization packet identifies a type or speed of the network traffic. In one embodiment, the synchronization packet identifies a WAN speed or WAN type connection. The LAN/WAN detector 238 also identifies receipt of an acknowledgement packet to a tagged synchronization packet and on which port it is received. The appliance 200 then configures itself to operate the identified port on which the tagged synchronization packet arrived so that the speed on that port is set to be the speed associated with the network connected to that port. The other port is then set to the speed associated with the network connected to that port.

For ease of discussion herein, reference to "fast" side will be made with respect to connection with a wide area network (WAN), e.g., the Internet, and operating at a network speed of the WAN. Likewise, reference to "slow" side will be made with respect to connection with a local area network (LAN) and operating at a network speed the LAN. However, it is noted that "fast" and "slow" sides in a network can change on a per-connection basis and are relative terms to the speed of the network connections or to the type of network topology. Such configurations are useful in complex network topologies, where a network is "fast" or "slow" only when compared to adjacent networks and not in any absolute sense.

In one embodiment, the LAN/WAN detector 238 may be used to allow for auto-discovery by an appliance 200 of a network to which it connects. In another embodiment, the LAN/WAN detector 238 may be used to detect the existence or presence of a second appliance 200' deployed in the network 104. For example, an auto-discovery mechanism in operation in accordance with FIG. 1A functions as follows: appliance 200 and 200' are placed in line with the connection linking client 102 and server 106. The appliances 200 and 200' are at the ends of a low-speed link, e.g., Internet, connecting two LANs. In one example embodiment, appliances 200 and 200' each include two ports—one to connect with the "lower" speed link and the other to connect with a "higher" speed link, e.g., a LAN. Any packet arriving at one port is copied to the other port. Thus, appliance 200 and 200' are each configured to function as a bridge between the two networks 104.

When an end node, such as the client 102, opens a new TCP connection with another end node, such as the server 106, the client 102 sends a TCP packet with a synchronization (SYN) header bit set, or a SYN packet, to the server 106. In the present example, client 102 opens a transport layer connection to server 106. When the SYN packet passes through appliance 200, the appliance 200 inserts, attaches or otherwise provides a characteristic TCP header option to the packet, which announces its presence. If the packet passes through a second appliance, in this example appliance 200' the second appliance notes the header option on the SYN packet. The server 106 responds to the SYN packet with a synchronization acknowledgment (SYN-ACK) packet. When the SYN-ACK packet passes through appliance 200', a TCP header option is tagged (e.g., attached, inserted or added) to the SYN-ACK packet to announce appliance 200' presence to appliance 200. When appliance 200 receives this packet, both appliances 200, 200' are now aware of each other and the connection can be appropriately accelerated.

Further to the operations of the LAN/WAN detector 238, a method or process for detecting "fast" and "slow" sides of a network using a SYN packet is described. During a transport layer connection establishment between a client 102 and a server 106, the appliance 200 via the LAN/WAN detector 238 determines whether the SYN packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configure the port receiving the untagged packet as the "fast" side. The appliance 200 then tags the SYN packet with an ACK and copies the packet to the other port.

In another embodiment, the LAN/WAN detector 238 detects fast and slow sides of a network using a SYN-ACK packet. The appliance 200 via the LAN/WAN detector 238 determines whether the SYN-ACK packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configures the port receiving the untagged packet as the "fast" side. The LAN/WAN detector 238 determines whether the SYN packet was tagged. If the SYN packet was not tagged, the appliance 200 copied the packet to the other port. If the SYN packet was tagged, the appliance tags the SYN-ACK packet before copying it to the other port.

The appliance 200, 200' may add, insert, modify, attach or otherwise provide any information or data in the TCP option header to provide any information, data or characteristics about the network connection, network traffic flow, or the configuration or operation of the appliance 200. In this manner, not only does an appliance 200 announce its presence to another appliance 200' or tag a higher or lower speed connection, the appliance 200 provides additional information and data via the TCP option headers about the appliance or the connection. The TCP option header information may be useful to or used by an appliance in controlling, managing, optimizing, acceleration or improving the network traffic flow traversing the appliance 200, or to otherwise configure itself or operation of a network port.

Although generally described in conjunction with detecting speeds of network connections or the presence of appliances, the LAN/WAN detector 238 can be used for applying any type of function, logic or operation of the appliance 200 to a port, connection or flow of network traffic. In particular, automated assignment of ports can occur whenever a device performs different functions on different ports, where the assignment of a port to a task can be made during the unit's operation, and/or the nature of the network segment on each port is discoverable by the appliance 200.

Flow Control

The flow controller 220 includes any logic, business rules, function or operations for optimizing, accelerating or otherwise improving the performance, operation or quality of service of transport layer communications of network packets or the delivery of packets at the transport layer. A flow controller, also sometimes referred to as a flow control module, regulates, manages and controls data transfer rates. In some embodiments, the flow controller 220 is deployed at or connected at a bandwidth bottleneck in the network 104. In one embodiment, the flow controller 220 effectively regulates, manages and controls bandwidth usage or utilization. In other embodiments, the flow control modules may also be deployed at points on the network of latency transitions (low latency to high latency) and on links with media losses (such as wireless or satellite links).

In some embodiments, a flow controller 220 may include a receiver-side flow control module for controlling the rate of receipt of network transmissions and a sender-side flow control module for the controlling the rate of transmissions of network packets. In other embodiments, a first flow controller 220 includes a receiver-side flow control module and a second flow controller 220' includes a sender-side flow control module. In some embodiments, a first flow controller 220 is deployed on a first appliance 200 and a second flow controller 220' is deployed on a second appliance 200'. As such, in some embodiments, a first appliance 200 controls the flow of data on the receiver side and a second appliance 200' controls the data flow from the sender side. In yet another embodiment, a single appliance 200 includes flow control for both the receiver-side and sender-side of network communications traversing the appliance 200.

In one embodiment, a flow control module 220 is configured to allow bandwidth at the bottleneck to be more fully utilized, and in some embodiments, not overutilized. In some embodiments, the flow control module 220 transparently buffers (or rebuffers data already buffered by, for example, the sender) network sessions that pass between nodes having associated flow control modules 220. When a session passes through two or more flow control modules 220, one or more of the flow control modules controls a rate of the session(s).

In one embodiment, the flow control module 200 is configured with predetermined data relating to bottleneck bandwidth. In another embodiment, the flow control module 220 may be configured to detect the bottleneck bandwidth or data associated therewith. Unlike conventional network protocols such as TCP, a receiver-side flow control module 220 controls the data transmission rate. The receiver-side flow control module controls 220 the sender-side flow control module, e.g., 220, data transmission rate by forwarding transmission rate limits to the sender-side flow control module 220. In one embodiment, the receiver-side flow control module 220 piggybacks these transmission rate limits on acknowledgement (ACK) packets (or signals) sent to the sender, e.g., client 102, by the receiver, e.g., server 106. The receiver-side flow control module 220 does this in response to rate control requests that are sent by the sender side flow control module 220'. The requests from the sender-side flow control module 220' may be "piggybacked" on data packets sent by the sender 106.

In some embodiments, the flow controller 220 manipulates, adjusts, simulates, changes, improves or otherwise adapts the behavior of the transport layer protocol to provide improved performance or operations of delivery, data rates and/or bandwidth utilization of the transport layer. The flow controller 220 may implement a plurality of data flow control techniques at the transport layer, including but not limited to 1) pre-acknowledgements, 2) window virtualization, 3) recongestion techniques, 3) local retransmission techniques, 4) wavefront detection and disambiguation, 5) transport control protocol selective acknowledgements, 6) transaction boundary detection techniques and 7) repacketization.

Although a sender may be generally described herein as a client 102 and a receiver as a server 106, a sender may be any end point such as a server 106 or any computing device 100 on the network 104. Likewise, a receiver may be a client 102 or any other computing device on the network 104.

Pre-Acknowledgements

In brief overview of a pre-acknowledgement flow control technique, the flow controller 220, in some embodiments, handles the acknowledgements and retransmits for a sender, effectively terminating the sender's connection with the downstream portion of a network connection. In reference to FIG. 1B, one possible deployment of an appliance 200 into a network architecture to implement this feature is depicted. In this example environment, a sending computer or client 102 transmits data on network 104, for example, via a switch, which determines that the data is destined for VPN appliance 205. Because of the chosen network topology, all data destined for VPN appliance 205 traverses appliance 200, so the appliance 200 can apply any necessary algorithms to this data.

Continuing further with the example, the client 102 transmits a packet, which is received by the appliance 200. When the appliance 200 receives the packet, which is transmitted from the client 102 to a recipient via the VPN appliance 205 the appliance 200 retains a copy of the packet and forwards the packet downstream to the VPN appliance 205. The appliance 200 then generates an acknowledgement packet (ACK) and sends the ACK packet back to the client 102 or sending endpoint. This ACK, a pre-acknowledgment, causes the sender 102 to believe that the packet has been delivered successfully, freeing the sender's resources for subsequent processing. The appliance 200 retains the copy of the packet data in the event that a retransmission of the packet is required, so that the sender 102 does not have to handle retransmissions of the data. This early generation of acknowledgements may be called "preacking."

If a retransmission of the packet is required, the appliance 200 retransmits the packet to the sender. The appliance 200 may determine whether retransmission is required as a sender would in a traditional system, for example, determining that a packet is lost if an acknowledgement has not been received for the packet after a predetermined amount of time. To this end, the appliance 200 monitors acknowledgements generated by the receiving endpoint, e.g., server 106 (or any other downstream network entity) so that it can determine whether the packet has been successfully delivered or needs to be retransmitted. If the appliance 200 determines that the packet has been successfully delivered, the appliance 200 is free to discard the saved packet data. The appliance 200 may also inhibit forwarding acknowledgements for packets that have already been received by the sending endpoint.

In the embodiment described above, the appliance 200 via the flow controller 220 controls the sender 102 through the delivery of pre-acknowledgements, also referred to as "preacks", as though the appliance 200 was a receiving endpoint itself. Since the appliance 200 is not an endpoint and does not actually consume the data, the appliance 200 includes a mechanism for providing overflow control to the sending endpoint. Without overflow control, the appliance 200 could run out of memory because the appliance 200 stores packets that have been preacked to the sending endpoint but not yet acknowledged as received by the receiving endpoint. Therefore, in a situation in which the sender 102 transmits packets to the appliance 200 faster than the appliance 200 can forward the packets downstream, the memory available in the appliance 200 to store unacknowledged packet data can quickly fill. A mechanism for overflow control allows the appliance 200 to control transmission of the packets from the sender 102 to avoid this problem.

In one embodiment, the appliance 200 or flow controller 220 includes an inherent "self-clocking" overflow control mechanism. This self-clocking is due to the order in which the appliance 200 may be designed to transmit packets downstream and send ACKs to the sender 102 or 106. In some embodiments, the appliance 200 does not preack the packet until after it transmits the packet downstream. In this way, the sender 102 will receive the ACKs at the rate at which the appliance 200 is able to transmit packets rather than the rate at which the appliance 200 receives packets from the sender 100. This helps to regulate the transmission of packets from a sender 102.

Window Virtualization

Another overflow control mechanism that the appliance 200 may implement is to use the TCP window size parameter, which tells a sender how much buffer the receiver is permitting the sender to fill up. A nonzero window size (e.g., a size of at least one Maximum Segment Size (MSS)) in a preack permits the sending endpoint to continue to deliver data to the appliance, whereas a zero window size inhibits further data transmission. Accordingly, the appliance 200 may regulate the flow of packets from the sender, for example when the appliance's 200 buffer is becoming full, by appropriately setting the TCP window size in each preack.

Another technique to reduce this additional overhead is to apply hysteresis. When the appliance 200 delivers data to the slower side, the overflow control mechanism in the appliance 200 can require that a minimum amount of space be available before sending a nonzero window advertisement to the sender. In one embodiment, the appliance 200 waits until there is a minimum of a predetermined number of packets, such as four packets, of space available before sending a nonzero window packet, such as a window size of four packet). This reduces the overhead by approximately a factor four, since only two ACK packets are sent for each group of four data packets, instead of eight ACK packets for four data packets.

Another technique the appliance 200 or flow controller 220 may use for overflow control is the TCP delayed ACK mechanism, which skips ACKs to reduce network traffic. The TCP delayed ACKs automatically delay the sending of an ACK, either until two packets are received or until a fixed timeout has occurred. This mechanism alone can result in cutting the overhead in half; moreover, by increasing the numbers of packets above two, additional overhead reduction is realized. But merely delaying the ACK itself may be insufficient to control overflow, and the appliance 200 may also use the advertised window mechanism on the ACKs to control the sender. When doing this, the appliance 200 in one embodiment avoids triggering the timeout mechanism of the sender by delaying the ACK too long.

In one embodiment, the flow controller 220 does not preack the last packet of a group of packets. By not preacking the last packet, or at least one of the packets in the group, the appliance avoids a false acknowledgement for a group of packets. For example, if the appliance were to send a preack for a last packet and the packet were subsequently lost, the sender would have been tricked into thinking that the packet is delivered when it was not. Thinking that the packet had been delivered, the sender could discard that data. If the appliance also lost the packet, there would be no way to retransmit the packet to the recipient. By not preacking the last packet of a group of packets, the sender will not discard the packet until it has been delivered.

In another embodiment, the flow controller 220 may use a window virtualization technique to control the rate of flow or bandwidth utilization of a network connection. Though it may not immediately be apparent from examining conventional literature such as RFC 1323, there is effectively a send window for transport layer protocols such as TCP. The send window is similar to the receive window, in that it consumes buffer space (though on the sender). The sender's send window consists of all data sent by the application that has not been acknowledged by the receiver. This data must be retained in memory in case retransmission is required. Since memory is a shared resource, some TCP stack implementations limit the size of this data. When the send window is full, an attempt by an application program to send more data results in blocking the application program until space is available. Subsequent reception of acknowledgements will free send-window memory and unblock the application program. In some embodiments, this window size is known as the socket buffer size in some TCP implementations.

In one embodiment, the flow control module 220 is configured to provide access to increased window (or buffer) sizes. This configuration may also be referenced to as window virtualization. In the embodiment of TCP as the transport layer protocol, the TCP header includes a bit string corresponding to a window scale. In one embodiment, "window" may be referenced in a context of send, receive, or both.

One embodiment of window virtualization is to insert a preacking appliance 200 into a TCP session. In reference to any of the environments of FIG. 1A or 1B, initiation of a data communication session between a source node, e.g., client 102 (for ease of discussion, now referenced as source node 102), and a destination node, e.g., server 106 (for ease of discussion, now referenced as destination node 106) is established. For TCP communications, the source node 102 initially transmits a synchronization signal ("SYN") through its local area network 104 to first flow control module 220. The first flow control module 220 inserts a configuration identifier into the TCP header options area. The configuration identifier identifies this point in the data path as a flow control module.

The appliances 200 via a flow control module 220 provide window (or buffer) to allow increasing data buffering capabilities within a session despite having end nodes with small buffer sizes, e.g., typically 16 k bytes. However, RFC 1323 requires window scaling for any buffer sizes greater than 64 k bytes, which must be set at the time of session initialization (SYN, SYN-ACK signals). Moreover, the window scaling corresponds to the lowest common denominator in the data path, often an end node with small buffer size. This window scale often is a scale of 0 or 1, which corresponds to a buffer size of up to 64 k or 128 k bytes. Note that because the window size is defined as the window field in each packet shifted over by the window scale, the window scale establishes an upper limit for the buffer, but does not guarantee the buffer is actually that large. Each packet indicates the current available buffer space at the receiver in the window field.

In one embodiment of scaling using the window virtualization technique, during connection establishment (i.e., initialization of a session) when the first flow control module 220 receives from the source node 102 the SYN signal (or packet), the flow control module 220 stores the windows scale of the source node 102 (which is the previous node) or stores a 0 for window scale if the scale of the previous node is missing. The first flow control module 220 also modifies the scale, e.g., increases the scale to 4 from 0 or 1, in the SYN-FCM signal. When the second flow control module 220 receives the SYN signal, it stores the increased scale from the first flow control signal and resets the scale in the SYN signal back to the source node 103 scale value for transmission to the destination node 106. When the second flow controller 220 receives the SYN-ACK signal from the destination node 106, it stores the scale from the destination node 106 scale, e.g., 0 or 1, and modifies it to an increased scale that is sent with the SYN-ACK-FCM signal. The first flow control node 220 receives and notes the received window scale and revises the windows scale sent back to the source node 102 back down to the original scale, e.g., 0 or 1. Based on the above window shift conversation during connection establishment, the window field in every subsequent packet, e.g., TCP packet, of the session must be shifted according to the window shift conversion.

The window scale, as described above, expresses buffer sizes of over 64 k and may not be required for window virtualization. Thus, shifts for window scale may be used to express increased buffer capacity in each flow control module 220. This increase in buffer capacity in may be referenced as window (or buffer) virtualization. The increase in buffer size allows greater packet through put from and to the respective end nodes 102 and 106. Note that buffer sizes in TCP are typically expressed in terms of bytes, but for ease of discussion "packets" may be used in the description herein as it relates to virtualization.

By way of example, a window (or buffer) virtualization performed by the flow controller 220 is described. In this example, the source node 102 and the destination node 106 are configured similar to conventional end nodes having a limited buffer capacity of 16 k bytes, which equals approximately 10 packets of data. Typically, an end node 102, 106 must wait until the packet is transmitted and confirmation is received before a next group of packets can be transmitted. In one embodiment, using increased buffer capacity in the flow control modules 220, when the source node 103 transmits its data packets, the first flow control module 220 receives the packets, stores it in its larger capacity buffer, e.g., 512 packet capacity, and immediately sends back an acknowledgement signal indicating receipt of the packets ("REC-ACK") back to the source node 102. The source node 102 can then "flush" its current buffer, load it with 10 new data packets, and transmit those onto the first flow control module 220. Again, the first flow control module 220 transmits a REC-ACK signal back to the source node 102 and the source node 102 flushes its buffer and loads it with 10 more new packets for transmission.

As the first flow control module 220 receives the data packets from the source nodes, it loads up its buffer accordingly. When it is ready the first flow control module 220 can begin transmitting the data packets to the second flow control module 230, which also has an increased buffer size, for example, to receive 512 packets. The second flow control module 220' receives the data packets and begins to transmit 10 packets at a time to the destination node 106. Each REC-ACK received at the second flow control node 220 from the destination node 106 results in 10 more packets being transmitted to the destination node 106 until all the data packets are transferred. Hence, the present invention is able to increase data transmission throughput between the source node (sender) 102 and the destination node (receiver) 106 by taking advantage of the larger buffer in the flow control modules 220, 220' between the devices.

It is noted that by "preacking" the transmission of data as described previously, a sender (or source node 102) is allowed to transmit more data than is possible without the preacks, thus affecting a larger window size. For example, in one embodiment this technique is effective when the flow control module 220, 220' is located "near" a node (e.g., source node 102 or destination node 106) that lacks large windows.

Recongestion

Another technique or algorithm of the flow controller 220 is referred to as recongestion. The standard TCP congestion avoidance algorithms are known to perform poorly in the face of certain network conditions, including: large RTTs (round trip times), high packet loss rates, and others. When the appliance 200 detects a congestion condition such as long round trip times or high packet loss, the appliance 200 intervenes, substituting an alternate congestion avoidance algorithm that better suits the particular network condition. In one embodiment, the recongestion algorithm uses preacks to effectively terminate the connection between the sender and the receiver. The appliance 200 then resends the packets from itself to the receiver, using a different congestion avoidance algorithm. Recongestion algorithms may be dependent on the characteristics of the TCP connection. The appliance 200 monitors each TCP connection, characterizing it with respect to the different dimensions, selecting a recongestion algorithm that is appropriate for the current characterization.

In one embodiment, upon detecting a TCP connection that is limited by round trip times (RTT), a recongestion algorithm is applied which behaves as multiple TCP connections. Each TCP connection operates within its own performance limit but the aggregate bandwidth achieves a higher performance level. One parameter in this mechanism is the number of parallel connections that are applied (N). Too large a value of N and the connection bundle achieves more than its fair share of bandwidth. Too small a value of N and the connection bundle achieves less than its fair share of bandwidth. One method of establishing "N" relies on the appliance 200 monitoring the packet loss rate, RTT, and packet size of the actual connection. These numbers are plugged into a TCP response curve formula to provide an upper limit on the performance of a single TCP connection in the present configuration. If each connection within the connection bundle is achieving substantially the same performance as that computed to be the upper limit, then additional parallel connections are applied. If the current bundle is achieving less performance than the upper limit, the number of parallel connections is reduced. In this manner, the overall fairness of the system is maintained since individual connection bundles contain no more parallelism than is required to eliminate the restrictions imposed by the protocol itself. Furthermore, each individual connection retains TCP compliance.

Another method of establishing "N" is to utilize a parallel flow control algorithm such as the TCP "Vegas" algorithm or its improved version "Stabilized Vegas." In this method, the network information associated with the connections in the connection bundle (e.g., RTT, loss rate, average packet size, etc.) is aggregated and applied to the alternate flow control algorithm. The results of this algorithm are in turn distributed among the connections of the bundle controlling their number (i.e., N). Optionally, each connection within the bundle continues using the standard TCP congestion avoidance algorithm.

In another embodiment, the individual connections within a parallel bundle are virtualized, i.e., actual individual TCP connections are not established. Instead the congestion avoidance algorithm is modified to behave as though there were N parallel connections. This method has the advantage of appearing to transiting network nodes as a single connection. Thus the QOS, security and other monitoring methods of these nodes are unaffected by the recongestion algorithm. In yet another embodiment, the individual connections within a parallel bundle are real, i.e., a separate. TCP connection is established for each of the parallel connections within a bundle. The congestion avoidance algorithm for each TCP connection need not be modified.

Retransmission

In some embodiments, the flow controller 220 may apply a local retransmission technique. One reason for implementing preacks is to prepare to transit a high-loss link (e.g., wireless). In these embodiments, the preacking appliance 200 or flow control module 220 is located most beneficially "before" the wireless link. This allows retransmissions to be performed closer to the high loss link, removing the retransmission burden from the remainder of the network. The appliance 200 may provide local retransmission, in which case, packets dropped due to failures of the link are retransmitted directly by the appliance 200. This is advantageous because it eliminates the retransmission burden upon an end node, such as server 106, and infrastructure of any of the networks 104. With appliance 200 providing local retransmissions, the dropped packet can be retransmitted across the high loss link without necessitating a retransmit by an end node and a corresponding decrease in the rate of data transmission from the end node.

Another reason for implementing preacks is to avoid a receive time out (RTO) penalty. In standard TCP there are many situations that result in an RTO, even though a large percentage of the packets in flight were successfully received. With standard TCP algorithms, dropping more than one packet within an RTT window would likely result in a timeout. Additionally, most TCP connections experience a timeout if a retransmitted packet is dropped. In a network with a high bandwidth delay product, even a relatively small packet loss rate will cause frequent Retransmission timeouts (RTOs). In one embodiment, the appliance 200 uses a retransmit and timeout algorithm is avoid premature RTOs. The appliance 200 or flow controller 220 maintains a count of retransmissions is maintained on a per-packet basis. Each time that a packet is retransmitted, the count is incremented by one and the appliance 200 continues to transmit packets. In some embodiments, only if a packet has been retransmitted a predetermined number of times is an RTO declared.

Wavefront Detection and Disambiguation

In some embodiments, the appliance 200 or flow controller 220 uses wavefront detection and disambiguation techniques in managing and controlling flow of network traffic. In this technique, the flow controller 220 uses transmit identifiers or numbers to determine whether particular data packets need to be retransmitted. By way of example, a sender transmits data packets over a network, where each instance of a transmitted data packet is associated with a transmit number. It can be appreciated that the transmit number for a packet is not the same as the packet's sequence number, since a sequence number references the data in the packet while the transmit number references an instance of a transmission of that data. The transmit number can be any information usable for this purpose, including a timestamp associated with a packet or simply an increasing number (similar to a sequence number or a packet number). Because a data segment may be retransmitted, different transmit numbers may be associated with a particular sequence number.

As the sender transmits data packets, the sender maintains a data structure of acknowledged instances of data packet transmissions. Each instance of a data packet transmission is referenced by its sequence number and transmit number. By maintaining a transmit number for each packet, the sender retains the ordering of the transmission of data packets. When the sender receives an ACK or a SACK, the sender determines the highest transmit number associated with packets that the receiver indicated has arrived (in the received acknowledgement). Any outstanding unacknowledged packets with lower transmit numbers are presumed lost.

In some embodiments, the sender is presented with an ambiguous situation when the arriving packet has been retransmitted: a standard ACK/SACK does not contain enough information to allow the sender to determine which transmission of the arriving packet has triggered the acknowledgement. After receiving an ambiguous acknowledgement, therefore, the sender disambiguates the acknowledgement to associate it with a transmit number. In various embodiments, one or a combination of several techniques may be used to resolve this ambiguity.

In one embodiment, the sender includes an identifier with a transmitted data packet, and the receiver returns that identifier or a function thereof with the acknowledgement. The identifier may be a timestamp (e.g., a TCP timestamp as described in RFC 1323), a sequential number, or any other information that can be used to resolve between two or more instances of a packet's transmission. In an embodiment in which the TCP timestamp option is used to disambiguate the acknowledgement, each packet is tagged with up to 32-bits of unique information. Upon receipt of the data packet, the receiver echoes this unique information back to the sender with the acknowledgement. The sender ensures that the originally sent packet and its retransmitted version or versions contain different values for the timestamp option, allowing it to unambiguously eliminate the ACK ambiguity. The sender may maintain this unique information, for example, in the data structure in which it stores the status of sent data packets. This technique is advantageous because it complies with industry standards and is thus likely to encounter little or no interoperability issues. However, this technique may require ten bytes of TCP header space in some implementations, reducing the effective throughput rate on the network and reducing space available for other TCP options.

In another embodiment, another field in the packet, such as the IP ID field, is used to disambiguate in a way similar to the TCP timestamp option described above. The sender arranges for the ID field values of the original and the retransmitted version or versions of the packet to have different ID fields in the IP header. Upon reception of the data packet at the receiver, or a proxy device thereof, the receiver sets the ID field of the ACK packet to a function of the ID field of the packet that triggers the ACK. This method is advantageous, as it requires no additional data to be sent, preserving the efficiency of the network and TCP header space. The function chosen should provide a high degree of likelihood of providing disambiguation. In a preferred embodiment, the sender selects IP ID values with the most significant bit set to 0. When the receiver responds, the IP ID value is set to the same IP ID value with the most significant bit set to a one.

In another embodiment, the transmit numbers associated with non-ambiguous acknowledgements are used to disambiguate an ambiguous acknowledgement. This technique is based on the principle that acknowledgements for two packets will tend to be received closer in time as the packets are transmitted closer in time. Packets that are not retransmitted will not result in ambiguity, as the acknowledgements received for such packets can be readily associated with a transmit number. Therefore, these known transmit numbers are compared to the possible transmit numbers for an ambiguous acknowledgement received near in time to the known acknowledgement. The sender compares the transmit numbers of the ambiguous acknowledgement against the last known received transmit number, selecting the one closest to the known received transmit number. For example, if an acknowledgement for data packet 1 is received and the last received acknowledgement was for data packet 5, the sender resolves the ambiguity by assuming that the third instance of data packet 1 caused the acknowledgement.

Selective Acknowledgements

Another technique of the appliance 200 or flow controller 220 is to implement an embodiment of transport control protocol selective acknowledgements, or TCP SACK, to determine what packets have or have not been received. This technique allows the sender to determine unambiguously a list of packets that have been received by the receiver as well as an accurate list of packets not received. This functionality may be implemented by modifying the sender and/or receiver, or by inserting sender- and receiver-side flow control modules 220 in the network path between the sender and receiver. In reference to FIG. 1A or FIG. 1B, a sender, e.g., client 102, is configured to transmit data packets to the receiver, e.g., server 106, over the network 104. In response, the receiver returns a TCP Selective Acknowledgment option, referred to as SACK packet to the sender. In one embodiment, the communication is bi-directional, although only one direction of communication is discussed here for simplicity. The receiver maintains a list, or other suitable data structure, that contains a group of ranges of sequence numbers for data packets that the receiver has actually received. In some embodiments the list is sorted by sequence number in an ascending or descending order. The receiver also maintains a left-off pointer, which comprises a reference into the list and indicates the left-off point from the previously generated SACK packet.

Upon reception of a data packet, the receiver generates and transmits a SACK packet back to the sender. In some embodiments, the SACK packet includes a number of fields, each of which can hold a range of sequence numbers to indicate a set of received data packets. The receiver fills this first field of the SACK packet with a range of sequence numbers that includes the landing packet that triggered the SACK packet. The remaining available SACK fields are filled with ranges of sequence numbers from the list of received packets. As there are more ranges in the list than can be loaded into the SACK packet, the receiver uses the left-off pointer to determine which ranges are loaded into the SACK packet. The receiver inserts the SACK ranges consecutively from the sorted list, starting from the range referenced by the pointer and continuing down the list until the available SACK range space in the TCP header of the SACK packet is consumed. The receiver wraps around to the start of the list if it reaches the end. In some embodiments, two or three additional SACK ranges can be added to the SACK range information.

Once the receiver generates the SACK packet, the receiver sends the acknowledgement back to the sender. The receiver then advances the left-off pointer by one or more SACK range entries in the list. If the receiver inserts four SACK ranges, for example, the left-off pointer may be advanced two SACK ranges in the list. When the advanced left-off pointer reaches at the end of the list, the pointer is reset to the start of the list, effectively wrapping around the list of known received ranges. Wrapping around the list enables the system to perform well, even in the presence of large losses of SACK packets, since the SACK information that is not communicated due to a lost SACK packet will eventually be communicated once the list is wrapped around.

It can be appreciated, therefore, that a SACK packet may communicate several details about the condition of the receiver. First, the SACK packet indicates that, upon generation of the SACK packet, the receiver had just received a data packet that is within the first field of the SACK information. Secondly, the second and subsequent fields of the SACK information indicate that the receiver has received the data packets within those ranges. The SACK information also implies that the receiver had not, at the time of the SACK packet's generation, received any of the data packets that fall between the second and subsequent fields of the SACK information. In essence, the ranges between the second and subsequent ranges in the SACK information are "holes" in the received data, the data therein known not to have been delivered. Using this method, therefore, when a SACK packet has sufficient space to include more than two SACK ranges, the receiver may indicate to the sender a range of data packets that have not yet been received by the receiver.

In another embodiment, the sender uses the SACK packet described above in combination with the retransmit technique described above to make assumptions about which data packets have been delivered to the receiver. For example, when the retransmit algorithm (using the transmit numbers) declares a packet lost, the sender considers the packet to be only conditionally lost, as it is possible that the SACK packet identifying the reception of this packet was lost rather than the data packet itself. The sender thus adds this packet to a list of potentially lost packets, called the presumed lost list. Each time a SACK packet arrives, the known missing ranges of data from the SACK packet are compared to the packets in the presumed lost list. Packets that contain data known to be missing are declared actually lost and are subsequently retransmitted. In this way, the two schemes are combined to give the sender better information about which packets have been lost and need to be retransmitted.

Transaction Boundary Detection

In some embodiments, the appliance 200 or flow controller 220 applies a technique referred to as transaction boundary detection. In one embodiment, the technique pertains to ping-pong behaved connections. At the TCP layer, ping-pong behavior is when one communicant—a sender—sends data and then waits for a response from the other communicant—the receiver. Examples of ping-pong behavior include remote procedure call, HTTP and others. The algorithms described above use retransmission timeout (RTO) to recover from the dropping of the last packet or packets associated with the transaction. Since the TCP RTO mechanism is extremely coarse in some embodiments, for example requiring a minimum one second value in all cases), poor application behavior may be seen in these situations.

In one embodiment, the sender of data or a flow control module 220 coupled to the sender detects a transaction boundary in the data being sent. Upon detecting a transaction boundary, the sender or a flow control module 220 sends additional packets, whose reception generates additional ACK or SACK responses from the receiver. Insertion of the additional packets is preferably limited to balance between improved application response time and network capacity utilization. The number of additional packets that is inserted may be selected according to the current loss rate associated with that connection, with more packets selected for connections having a higher loss rate.

One method of detecting a transaction boundary is time based. If the sender has been sending data and ceases, then after a period of time the sender or flow control module 200 declares a transaction boundary. This may be combined with other techniques. For example, the setting of the PSH (TCP Push) bit by the sender in the TCP header may indicate a transaction boundary. Accordingly, combining the time-based approach with these additional heuristics can provide for more accurate detection of a transaction boundary. In another technique, if the sender or flow control module 220 understands the application protocol, it can parse the protocol data stream and directly determine transaction boundaries. In some embodiment, this last behavior can be used independent of any time-based mechanism.

Responsive to detecting a transaction boundary, the sender or flow control module 220 transmits additional data packets to the receiver to cause acknowledgements therefrom. The additional data packets should therefore be such that the receiver will at least generate an ACK or SACK in response to receiving the data packet. In one embodiment, the last packet or packets of the transaction are simply retransmitted. This has the added benefit of retransmitting needed data if the last packet or packets had been dropped, as compared to merely sending dummy data packets. In another embodiment, fractions of the last packet or packets are sent, allowing the sender to disambiguate the arrival of these packets from their original packets. This allows the receiver to avoid falsely confusing any reordering adaptation algorithms. In another embodiment, any of a number of well-known forward error correction techniques can be used to generate additional data for the inserted packets, allowing for the reconstruction of dropped or otherwise missing data at the receiver.

In some embodiments, the boundary detection technique described herein helps to avoid a timeout when the acknowledgements for the last data packets in a transaction are dropped. When the sender or flow control module 220 receives the acknowledgements for these additional data packets, the sender can determine from these additional acknowledgements whether the last data packets have been received or need to be retransmitted, thus avoiding a timeout. In one embodiment, if the last packets have been received but their acknowledgements were dropped, a flow control module 220 generates an acknowledgement for the data packets and sends the acknowledgement to the sender, thus communicating to the sender that the data packets have been delivered. In another embodiment, if the last packets have not been received, a flow control module 200 sends a packet to the sender to cause the sender to retransmit the dropped data packets.

Repacketization

In yet another embodiment, the appliance 200 or flow controller 220 applies a repacketization technique for improving the flow of transport layer network traffic. In some embodiments, performance of TCP is proportional to packet size. Thus increasing packet sizes improves performance unless it causes substantially increased packet loss rates or other nonlinear effects, like IP fragmentation. In general, wired media (such as copper or fibre optics) have extremely low bit-error rates, low enough that these can be ignored. For these media, it is advantageous for the packet size to be the maximum possible before fragmentation occurs (the maximum packet size is limited by the protocols of the underlying transmission media). Whereas for transmission media with higher loss rates (e.g., wireless technologies such as WiFi, etc., or high-loss environments such as power-line networking, etc.), increasing the packet size may lead to lower transmission rates, as media-induced errors cause an entire packet to be dropped (i.e., media-induced errors beyond the capability of the standard error correcting code for that media), increasing the packet loss rate. A sufficiently large increase in the packet loss rate will actually negate any performance benefit of increasing packet size. In some cases, it may be difficult for a TCP endpoint to choose an optimal packet size. For example, the optimal packet size may vary across the transmission path, depending on the nature of each link.

By inserting an appliance 200 or flow control module 220 into the transmission path, the flow controller 220 monitors characteristics of the link and repacketizes according to determined link characteristics. In one embodiment, an appliance 200 or flow controller 220 repacketizes packets with sequential data into a smaller number of larger packets. In another embodiment, an appliance 200 or flow controller 220 repacketizes packets by breaking part a sequence of large packets into a larger number of smaller packets. In other embodiments, an appliance 200 or flow controller 220 monitors the link characteristics and adjusts the packet sizes through recombination to improve throughput.

QoS

Still referring to FIG. 2A, the flow controller 220, in some embodiments, may include a QoS Engine 236, also referred to as a QoS controller. In another embodiment, the appliance 200 and/or network optimization engine 250 includes the QoS engine 236, for example, separately but in communication with the flow controller 220. The QoS Engine 236 includes any logic, business rules, function or operations for performing one or more Quality of Service (QoS) techniques improving the performance, operation or quality of service of any of the network connections. In some embodiments, the QoS engine 236 includes network traffic control and management mechanisms that provide different priorities to different users, applications, data flows or connections. In other embodiments, the QoS engine 236 controls, maintains, or assures a certain level of performance to a user, application, data flow or connection. In one embodiment, the QoS engine 236 controls, maintains or assures a certain portion of bandwidth or network capacity for a user, application, data flow or connection. In some embodiments, the QoS engine 236 monitors the achieved level of performance or the quality of service corresponding to a user, application, data flow or connection, for example, the data rate and delay. In response to monitoring, the QoS engine 236 dynamically controls or adjusts scheduling priorities of network packets to achieve the desired level of performance or quality of service.

In some embodiments, the QoS engine 236 prioritizes, schedules and transmits network packets according to one or more classes or levels of services. In some embodiments, the class or level service may include: 1) best efforts, 2) controlled load, 3) guaranteed or 4) qualitative. For a best efforts class of service, the appliance 200 makes reasonable effort to deliver packets (a standard service level). For a controlled load class of service, the appliance 200 or QoS engine 236 approximates the standard packet error loss of the transmission medium or approximates the behavior of best-effort service in lightly loaded network conditions. For a guaranteed class of service, the appliance 200 or QoS engine 236 guarantees the ability to transmit data at a determined rate for the duration of the connection. For a qualitative class of service, the appliance 200 or QoS engine 236 the qualitative service class is used for applications, users, data flows or connection that require or desire prioritized traffic but cannot quantify resource needs or level of service. In these cases, the appliance 200 or QoS engine 236 determines the class of service or prioritization based on any logic or configuration of the QoS engine 236 or based on business rules or policies. For example, in one embodiment, the QoS engine 236 prioritizes, schedules and transmits network packets according to one or more policies as specified by the policy engine 295, 295′.

Protocol Acceleration

The protocol accelerator 234 includes any logic, business rules, function or operations for optimizing, accelerating, or otherwise improving the performance, operation or quality of service of one or more protocols. In one embodiment, the protocol accelerator 234 accelerates any application layer protocol or protocols at layers 5-7 of the network stack. In other embodiments, the protocol accelerator 234 accelerates a transport layer or a layer 4 protocol. In one embodiment, the protocol accelerator 234 accelerates layer 2 or layer 3 protocols. In some embodiments, the protocol accelerator 234 is configured, constructed or designed to optimize or accelerate each of one or more protocols according to the type of data, characteristics and/or behavior of the protocol. In another embodiment, the protocol accelerator 234 is configured, constructed or designed to improve a user experience, response times, network or computer load, and/or network or bandwidth utilization with respect to a protocol.

In one embodiment, the protocol accelerator 234 is configured, constructed or designed to minimize the effect of WAN latency on file system access. In some embodiments, the protocol accelerator 234 optimizes or accelerates the use of the CIFS (Common Internet File System) protocol to improve file system access times or access times to data and files. In some embodiments, the protocol accelerator 234 optimizes or accelerates the use of the NFS (Network File System) protocol. In another embodiment, the protocol accelerator 234 optimizes or accelerates the use of the File Transfer protocol (FTP).

In one embodiment, the protocol accelerator 234 is configured, constructed or designed to optimize or accelerate a protocol carrying as a payload or using any type and form of markup language. In other embodiments, the protocol accelerator 234 is configured, constructed or designed to optimize or accelerate a HyperText Transfer Protocol (HTTP). In another embodiment, the protocol accelerator 234 is configured, constructed or designed to optimize or accelerate a protocol carrying as a payload or otherwise using XML (eXtensible Markup Language).

Transparency and Multiple Deployment Configuration

In some embodiments, the appliance 200 and/or network optimization engine 250 is transparent to any data flowing across a network connection or link, such as a WAN link. In one embodiment, the appliance 200 and/or network optimization engine 250 operates in such a manner that the data flow across the WAN is recognizable by any network monitoring, QOS management or network analysis tools. In some embodiments, the appliance 200 and/or network optimization engine 250 does not create any tunnels or streams for transmitting data that may hide, obscure or otherwise make the network traffic not transparent. In other embodiments, the appliance 200 operates transparently in that the appliance does not change any of the source and/or destination address information or port information of a network packet, such as internet protocol addresses or port numbers. In other embodiments, the appliance 200 and/or network optimization engine 250 is considered to operate or behave transparently to the network, an application, client, server or other appliances or computing device in the network infrastructure. That is, in some embodiments, the appliance is transparent in that network related configuration of any device or appliance on the network does not need to be modified to support the appliance 200.

The appliance 200 may be deployed in any of the following deployment configurations: 1) in-line of traffic, 2) in proxy mode, or 3) in a virtual in-line mode. In some embodiments, the appliance 200 may be deployed inline to one or more of the following: a router, a client, a server or another network device or appliance. In other embodiments, the appliance 200 may be deployed in parallel to one or more of the following: a router, a client, a server or another network device or appliance. In parallel deployments, a client, server, router or other network appliance may be configured to forward, transfer or transit networks to or via the appliance 200.

In the embodiment of in-line, the appliance 200 is deployed inline with a WAN link of a router. In this way, all traffic from the WAN passes through the appliance before arriving at a destination of a LAN.

In the embodiment of a proxy mode, the appliance 200 is deployed as a proxy device between a client and a server. In some embodiments, the appliance 200 allows clients to make indirect connections to a resource on a network. For example, a client connects to a resource via the appliance 200, and the appliance provides the resource either by connecting to the resource, a different resource, or by serving the resource from a cache. In some cases, the appliance may alter the client's request or the server's response for various purposes, such as for any of the optimization techniques discussed herein. In other embodiments, the appliance 200 behaves as a transparent proxy, by intercepting and forwarding requests and responses transparently to a client and/or server. Without client-side configuration, the appliance 200 may redirect client requests to different servers or networks. In some embodiments, the appliance 200 may perform any type and form of network address translation, referred to as NAT, on any network traffic traversing the appliance.

In some embodiments, the appliance 200 is deployed in a virtual in-line mode configuration. In this embodiment, a router or a network device with routing or switching functionality is configured to forward, reroute or otherwise provide network packets destined to a network to the appliance 200. The appliance 200 then performs any desired processing on the network packets, such as any of the WAN optimization techniques discussed herein. Upon completion of processing, the appliance 200 forwards the processed network packet to the router to transmit to the destination on the network. In this way, the appliance 200 can be coupled to the router in parallel but still operate as it if the appliance 200 were inline. This deployment mode also provides transparency in that the source and destination addresses and port information are preserved as the packet is processed and transmitted via the appliance through the network.

End Node Deployment

Although the network optimization engine 250 is generally described above in conjunction with an appliance 200, the network optimization engine 250, or any portion thereof, may be deployed, distributed or otherwise operated on any end node, such as a client 102 and/or server 106. As such, a client or server may provide any of the systems and methods of the network optimization engine 250 described herein in conjunction with one or more appliances 200 or without an appliance 200.

Figure 2B:
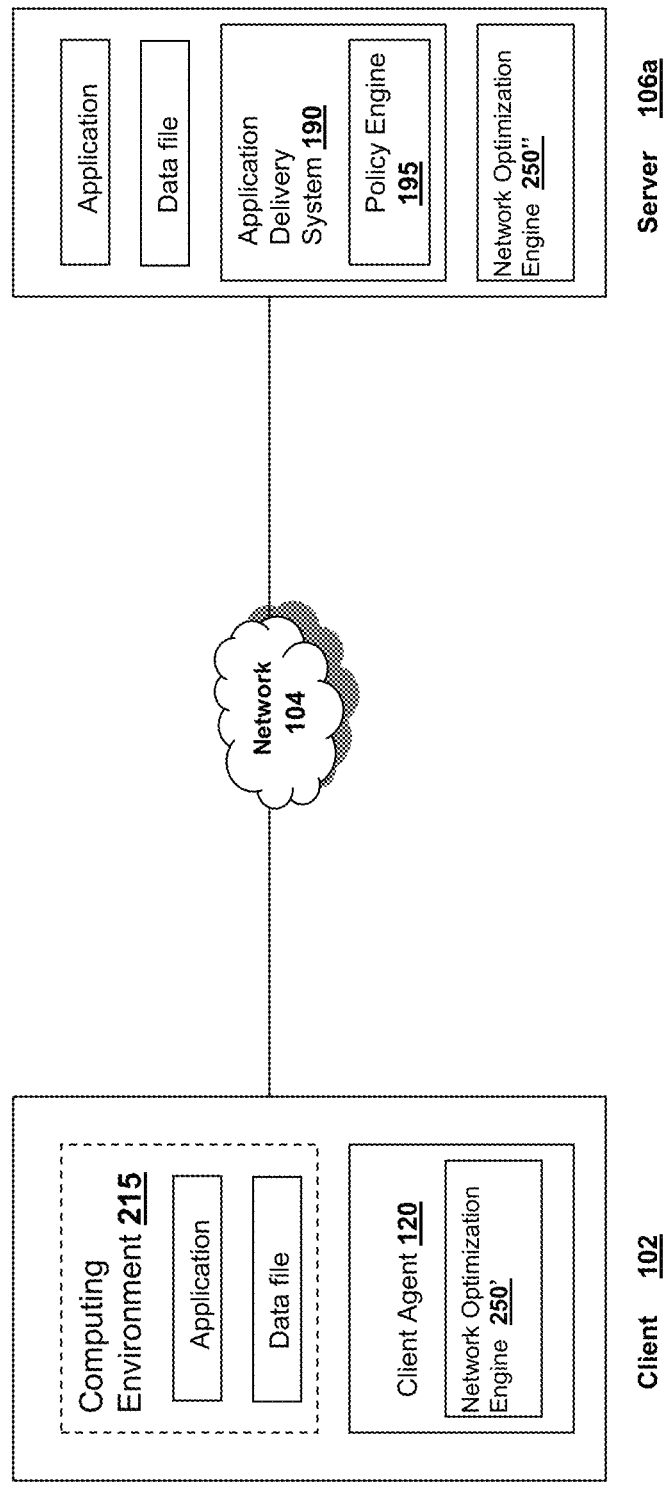
FIG. 2B is a block diagram of another embodiment of a client and/or server deploying the network optimization features of the appliance.

Referring now to FIG. 2B, an example embodiment of the network optimization engine 250 deployed on one or more end nodes is depicted. In brief overview, the client 102 may include a first network optimization engine 250' and the server 106 may include a second network optimization engine 250". The client 102 and server 106 may establish a transport layer connection and exchange communications with or without traversing an appliance 200.

In one embodiment, the network optimization engine 250' of the client 102 performs the techniques described herein to optimize, accelerate or otherwise improve the performance, operation or quality of service of network traffic communicated with the server 106. In another embodiment, the network optimization engine 250" of the server 106 performs the techniques described herein to optimize, accelerate or otherwise improve the performance, operation or quality of service of network traffic communicated with the client 102. In some embodiments, the network optimization engine 250' of the client 102 and the network optimization engine 250" of the server 106 perform the techniques described herein to optimize, accelerate or otherwise improve the performance, operation or quality of service of network traffic communicated between the client 102 and the server 106. In yet another embodiment, the network optimization engine 250' of the client 102 performs the techniques described herein in conjunction with an appliance 200 to optimize, accelerate or otherwise improve the performance, operation or quality of service of network traffic communicated with the client 102. In still another embodiment, the network optimization engine 250" of the server 106 performs the techniques described herein in conjunction with an appliance 200 to optimize, accelerate or otherwise improve the performance, operation or quality of service of network traffic communicated with the server 106.

C. Client Agent

Figure 3:
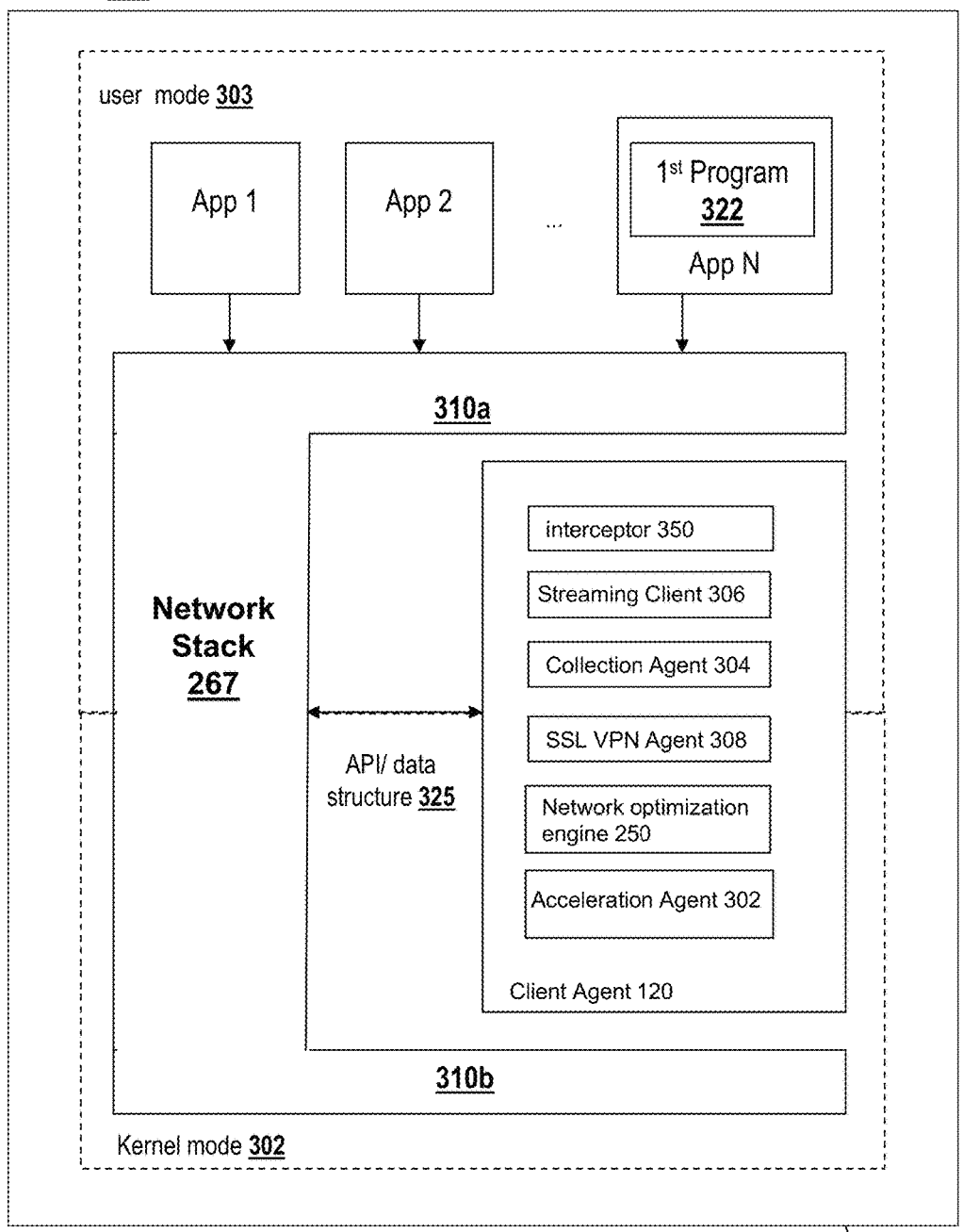
FIG. 3 is a block diagram of an embodiment of a client for communicating with a server using the network optimization feature.

Referring now to FIG. 3, an embodiment of a client agent 120 is depicted. The client 102 has a client agent 120 for establishing, exchanging, managing or controlling communications with the appliance 200, appliance 205 and/or server 106 via a network 104. In some embodiments, the client agent 120, which may also be referred to as a WAN client, accelerates WAN network communications and/or is used to communicate via appliance 200 on a network. In brief overview, the client 102 operates on computing device 100 having an operating system with a kernel mode 302 and a user mode 303, and a network stack 267 with one or more layers 310a-310b. The client 102 may have installed and/or execute one or more applications. In some embodiments, one or more applications may communicate via the network stack 267 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 267 from the one or more applications.

As with the appliance 200, the client has a network stack 267 including any type and form of software, hardware, or any combinations thereof, for providing connectivity to and communications with a network 104. The network stack 267 of the client 102 includes any of the network stack embodiments described above in conjunction with the appliance 200. In some embodiments, the client agent 120, or any portion thereof, is designed and constructed to operate with or work in conjunction with the network stack 267 installed or otherwise provided by the operating system of the client 102.

In further details, the network stack 267 of the client 102 or appliance 200 (or 205) may include any type and form of interfaces for receiving, obtaining, providing or otherwise accessing any information and data related to network communications of the client 102. In one embodiment, an interface to the network stack 267 includes an application programming interface (API). The interface may also have any function call, hooking or filtering mechanism, event or call back mechanism, or any type of interfacing technique. The network stack 267 via the interface may receive or provide any type and form of data structure, such as an object, related to functionality or operation of the network stack 267. For example, the data structure may include information and data related to a network packet or one or more network packets. In some embodiments, the data structure includes, references or identifies a portion of the network packet processed at a protocol layer of the network stack 267, such as a network packet of the transport layer. In some embodiments, the data structure 325 is a kernel-level data structure, while in other embodiments, the data structure 325 is a user-mode data structure. A kernel-level data structure may have a data structure obtained or related to a portion of the network stack 267 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 267 may execute or operate in kernel-mode 302, for example, the data link or network layer, while other portions execute or operate in user-mode 303, such as an application layer of the network stack 267. For example, a first portion 310a of the network stack may provide user-mode access to the network stack 267 to an application while a second portion 310a of the network stack 267 provides access to a network. In some embodiments, a first portion 310a of the network stack has one or more upper layers of the network stack 267, such as any of layers 5-7. In other embodiments, a second portion 310b of the network stack 267 includes one or more lower layers, such as any of layers 1-4. Each of the first portion 310a and second portion 310b of the network stack 267 may include any portion of the network stack 267, at any one or more network layers, in user-mode 303, kernel-mode 302, or combinations thereof, or at any portion of a network layer or interface point to a network layer or any portion of or interface point to the user-mode 302 and kernel-mode 203.

The interceptor 350 may include software, hardware, or any combination of software and hardware. In one embodiment, the interceptor 350 intercepts or otherwise receives a network communication at any point in the network stack 267, and redirects or transmits the network communication to a destination desired, managed or controlled by the interceptor 350 or client agent 120. For example, the interceptor 350 may intercept a network communication of a network stack 267 of a first network and transmit the network communication to the appliance 200 for transmission on a second network 104. In some embodiments, the interceptor 350 includes or is a driver, such as a network driver constructed and designed to interface and work with the network stack 267. In some embodiments, the client agent 120 and/or interceptor 350 operates at one or more layers of the network stack 267, such as at the transport layer. In one embodiment, the interceptor 350 includes a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 includes a driver complying with the Network Driver Interface Specification (NDIS), or a NDIS driver. In another embodiment, the interceptor 350 may be a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts or receives any transport layer connection requests. In these embodiments, the interceptor 350 executes transport layer application programming interface (API) calls to set the destination information, such as destination IP address and/or port to a desired location for the location. In this manner, the interceptor 350 intercepts and redirects the transport layer connection to an IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may include two agents 120 and 120'. In one embodiment, a first agent 120 may include an interceptor 350 operating at the network layer of the network stack 267. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 267. For example, in one embodiment, the interceptor 350 operates or interfaces with the transport layer of the network stack 267 transparently to any protocol layer below the transport layer, such as the network layer, and any protocol layer above the transport layer, such as the session, presentation or application layer protocols. This allows the other protocol layers of the network stack 267 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor 350 may operate at or interface with the network stack 267 in a manner transparent to any application, a user of the client 102, the client 102 and/or any other computing device 100, such as a server or appliance 200, 206, in communications with the client 102. The client agent 120, or any portion thereof, may be installed and/or executed on the client 102 in a manner without modification of an application. In one embodiment, the client agent 120, or any portion thereof, is installed and/or executed in a manner transparent to any network configuration of the client 102, appliance 200, 205 or server 106. In some embodiments, the client agent 120, or any portion thereof, is installed and/or executed with modification to any network configuration of the client 102, appliance 200, 205 or server 106. In one embodiment, the user of the client 102 or a computing device in communications with the client 102 are not aware of the existence, execution or operation of the client agent 12, or any portion thereof. As such, in some embodiments, the client agent 120 and/or interceptor 350 is installed, executed, and/or operated transparently to an application, user of the client 102, the client 102, another computing device, such as a server or appliance 200, 2005, or any of the protocol layers above and/or below the protocol layer interfaced to by the interceptor 350.

The client agent 120 includes a streaming client 306, a collection agent 304, SSL VPN agent 308, a network optimization engine 250, and/or acceleration program 302. In one embodiment, the client agent 120 is an Independent Computing Architecture (ICA) client, or any portion thereof, developed by Citrix Systems, Inc. of Fort Lauderdale, Fla., and is also referred to as an ICA client. In some embodiments, the client agent 120 has an application streaming client 306 for streaming an application from a server 106 to a client 102. In another embodiment, the client agent 120 includes a collection agent 304 for performing end-point detection/scanning and collecting end-point information for the appliance 200 and/or server 106. In some embodiments, the client agent 120 has one or more network accelerating or optimizing programs or agents, such as an network optimization engine 250 and an acceleration program 302. In one embodiment, the acceleration program 302 accelerates communications between client 102 and server 106 via appliance 205'. In some embodiments, the network optimization engine 250 provides WAN optimization techniques as discussed herein.

The streaming client 306 is an application, program, process, service, task or set of executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 is an application, program, process, service, task or set of executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 is an endpoint detection and scanning program, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or version of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

The SSL VPN agent 308 is an application, program, process, service, task or set of executable instructions for establishing a Secure Socket Layer (SSL) virtual private network (VPN) connection from a first network 104 to a second network 104', 104", or a SSL VPN connection from a client 102 to a server 106. In one embodiment, the SSL VPN agent 308 establishes a SSL VPN connection from a public network 104 to a private network 104' or 104". In some embodiments, the SSL VPN agent 308 works in conjunction with appliance 205 to provide the SSL VPN connection. In one embodiment, the SSL VPN agent 308 establishes a first transport layer connection with appliance 205. In some embodiment, the appliance 205 establishes a second transport layer connection with a server 106. In another embodiment, the SSL VPN agent 308 establishes a first transport layer connection with an application on the client, and a second transport layer connection with the appliance 205. In other embodiments, the SSL VPN agent 308 works in conjunction with WAN optimization appliance 200 to provide SSL VPN connectivity.

In some embodiments, the acceleration program 302 is a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

In one embodiment, the acceleration program 302 is designed, constructed or configured to work with appliance 205 to provide LAN side acceleration or to provide acceleration techniques provided via appliance 205. For example, in one embodiment of a NetScaler appliance 205 manufactured by Citrix Systems, Inc., the acceleration program 302 includes a NetScaler client. In some embodiments, the acceleration program 302 provides NetScaler acceleration techniques stand-alone in a remote device, such as in a branch office. In other embodiments, the acceleration program 302 works in conjunction with one or more NetScaler appliances 205. In one embodiment, the acceleration program 302 provides LAN-side or LAN based acceleration or optimization of network traffic.

In some embodiments, the network optimization engine 250 may be designed, constructed or configured to work with WAN optimization appliance 200. In other embodiments, network optimization engine 250 may be designed, constructed or configured to provide the WAN optimization techniques of appliance 200, with or without an appliance 200. For example, in one embodiment of a WANScaler appliance 200 manufactured by Citrix Systems, Inc. the network optimization engine 250 includes the WANscaler client. In some embodiments, the network optimization engine 250 provides WANScaler acceleration techniques stand-alone in a remote location, such as a branch office. In other embodiments, the network optimization engine 250 works in conjunction with one or more WANScaler appliances 200.

In another embodiment, the network optimization engine 250 includes the acceleration program 302, or the function, operations and logic of the acceleration program 302. In some embodiments, the acceleration program 302 includes the network optimization engine 250 or the function, operations and logic of the network optimization engine 250. In yet another embodiment, the network optimization engine 250 is provided or installed as a separate program or set of executable instructions from the acceleration program 302.

In other embodiments, the network optimization engine 250 and acceleration program 302 are included in the same program or same set of executable instructions.

In some embodiments and still referring to FIG. 3, a first program 322 may be used to install and/or execute the client agent 120, or any portion thereof, automatically, silently, transparently, or otherwise. In one embodiment, the first program 322 is a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 is designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers and the client agent 120, or any portion thereof, on the operating system of the client 102.

In some embodiments, each or any of the portions of the client agent 120—a streaming client 306, a collection agent 304, SSL VPN agent 308, a network optimization engine 250, acceleration program 302, and interceptor 350—may be installed, executed, configured or operated as a separate application, program, process, service, task or set of executable instructions. In other embodiments, each or any of the portions of the client agent 120 may be installed, executed, configured or operated together as a single client agent 120.

D. Systems and Methods for Classifying Network Packets

Traditional QoS and acceleration processes may classify network packets via source or destination IP, but this may be inefficient and counterproductive when a single IP address is associated with several applications. For example, a client at one IP address could execute a VoIP application requiring a high service priority, a web browsing process with medium priority, and an FTP client with a low priority, but if QoS and acceleration is only based on the IP address, these distinctions would be lost. Furthermore, even if port numbers are used to attempt to distinguish services, distinctions between applications using the same port are lost. For example, a system that considers all traffic on TCP port 80 to be medium-priority web browsing may not recognize that some of the traffic is a low-priority http file transfer, some is a medium or high-priority web application, and still other is streamed multimedia using port 80 to tunnel through a firewall.

Further distinctions may exist, too. For example, in environments using ICA, RDP, or other application delivery protocols or systems, application data traffic for multiple applications, including word processors, email applications, VoIP or video chat applications, file system explorers, or other applications, may be transmitted via a data or control channel on a single port. Distinctions between these applications, and their differing requirements of QoS and priority would be lost. Similarly, in environments in which application data from multiple applications is sent via a single encrypted channel, an intermediary passing the encrypted traffic may not be able to determine priority and implement proper queuing.

Accordingly, in some embodiments of the above discussed systems, network performance may be enhanced and optimized by providing QoS and acceleration engines with packet- or data-specific information. In addition to source and destination IP addresses and port numbers, packet- or data-specific information can include direction of traffic (client to host or server; server or host to client; or both), Virtual LAN (VLAN) ID, source or destination application or associated application, service class, ICA priority, type of service, differentiated service code point (DSCP), or other information. Some or all of this information may be used to classify the network packet at a plurality of layers of a network stack, allowing for deep inspection of the packet and multiple levels of granularity of classification.

Figure 4A:
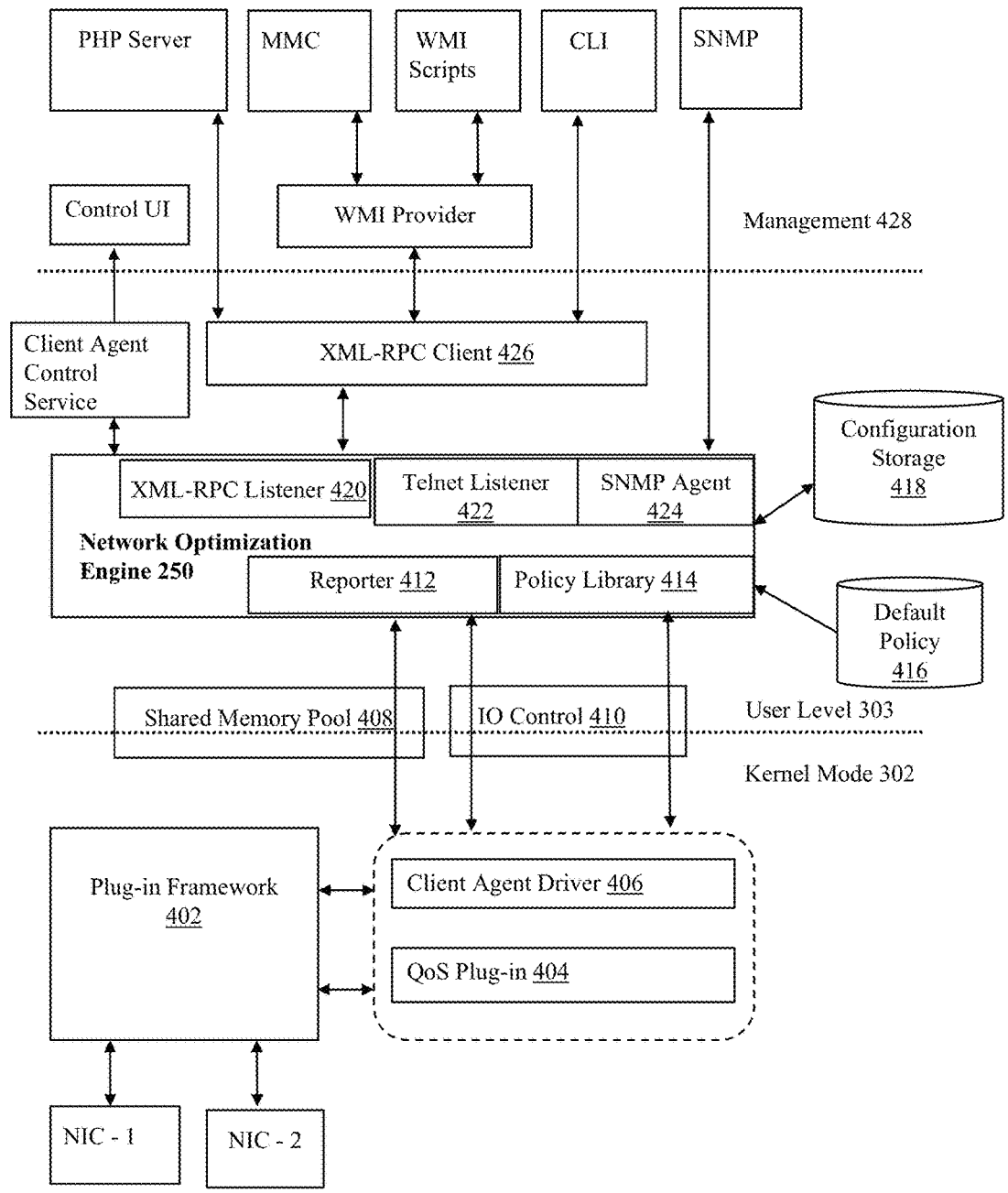
FIG. 4A is a block diagram of an embodiment of a system for providing multi-level classification of a network packet.

Referring now to FIG. 4A, shown is a block diagram of an embodiment of a system for providing multi-level classification of a network packet. In brief overview, the system includes elements operating in kernel-mode 302 and user-mode 303. Elements operating in kernel-mode 302 may include one or more NICs, which may comprise one or more network interfaces 118, discussed above in connection with FIG. 1D; a plug-in framework 402, a QoS plug-in 404, and a client agent driver 406. These components may interact, communicate, or exchange data with elements operating in user-mode 303 via a shared memory pool 408 and/or an IO control channel 410. Elements operating in user-mode 303 may include a network optimization engine 250, an XML-Remote Procedure Call (RPC) client 426, a client agent control service, and storage of default policies 416 and configuration data 418. In some embodiments, network optimization engine 250 may include a reporter 412, policy library 414, XML-RPC listener 420, telnet listener 422, and a simple network management protocol (SNMP) agent 424. Furthermore, a management layer 428 provides management components including a PHP: Hypertext Preprocessor (PHP) server; a command line interface (CLI), capable of providing a telnet or ssh shell; an SNMP interface; and a management interface such as Microsoft management console (MMC) and/or Windows management instrumentation (WMI) via a WMI provider service.

Still referring to FIG. 4A and in more depth, in some embodiments, the system may include a plug-in framework 402. Plug-in framework 402 may comprise a library, service, process, module, extensible service provider or other interface for managing or controlling the execution of network services. In some embodiments, plug-in framework 402 may provide an interface between applications and layers of a network stack below the application layer. In some embodiments, plug-in framework 402 may manage multiple plug-ins or network service providers and execute said network service providers or plug-ins in a proper order. For example, it may be inefficient in some embodiments to encrypt data prior to performing packet filtering operations. Such execution order may be determined dynamically, on a per-packet basis. For example, in one embodiment, encryption may performed after content-filtering on transmitted packets, and performed prior to content-filtering on received packets, such that content-filtering is always performed on decrypted packets. Similarly, by determining which plug-ins are needed on a per-packet basis, plug-in framework 402 may reduce overhead for less used functions and increase efficiency of operations.

Plug-ins to the plug-in framework 402 may include encryption, compression, security, proxies, re-routing, filtering, deep-packet inspection, acceleration, flow control, disk-based or memory-based compression, or other services. In one embodiment, plug-ins may include a QoS plug-in 404. In some embodiments, QoS plug-in 404 may provide per-packet QoS and priority queuing, bandwidth limiting and regulation, and traffic blocking. In some embodiments, QoS plug-in 404 may set Type of Service (ToS) bits in a packet for management by intelligent switches and QoS-enabled routers. In a further embodiment, QoS plug-in 404 may set ToS bits in conformance with a differentiated service code points (DSCP) scheme, such as that described in IETF RFC 2474, or any other service class and priority queuing system.

Plug-in framework 402 may, in some embodiments, include a packet interception and filtering system. In one embodiment, plug-in framework 402 may intercept a packet at one or more layers of a network stack below the application layer and utilize one or more filters on the packet to determine one or more plug-ins to apply. For example, in one embodiment, plug-in framework 402 may intercept a packet received by a network interface and may utilize a filter to determine if the packet is encrypted. If the packet is encrypted, plug-in framework 402 may apply a decryption plug-in. If the packet is not encrypted, plug-in framework 402 may disable or not apply the decryption plug-in, reducing the amount of processing needed for the packet. In some embodiments, these filters may be applied on a per-packet basis. In another embodiment, these filters may be applied on a per-flow basis, a per-class basis, a per-link basis, or other less granular bases. In some embodiments, plug-in framework 402 may include and manage any components of any embodiments of the client agent of FIG. 3.

As shown in FIG. 4A, plug-in framework 402 may provide plug-in management for one or more NICs. Each NIC may provide one or more communications links or ports. These communications links may be defined to differentiate network traffic to different physical network segments, and may include multiple links per adapter. Filters may be applied by plug-in framework 402 to links according to a filter policy. A filter policy may indicate one or more filters to be applied to packets received or transmitted via a link, and may include an order in which the filters are applied. Additionally, in some embodiments, multiple filter policies may be applied to a link, and each policy may have an associated priority. For example, in one embodiment, a first policy with a high order may be applied to all links, while a second policy with a lower order may be applied to one or more specific links, such as links associated with internal network segments on a LAN. Plug-in framework 402 may apply these policies based on the order, such that, in the example above, the first policy may be applied first and the second policy applied second. This allows for different filtering and processing operations on different network segments. In some embodiments, different policies may be applied to traffic on a link, depending on direction. For example, a first policy may be applied to inbound packets, while a second policy is applied to outbound packets.

In some embodiments, QoS plug-in 404 may comprise a service, process, subroutine, or other executable code for classifying packets and applying QoS policies. In other embodiments, QoS plug-in 404 may comprise a library, database, policy set, or functions executed by plug-in framework 402 for classifying packets and applying QoS policies. In one embodiment, QoS plug-in 404 provides functionality for identifying various ethernet protocols, including IP, non-IP, TCP and UDP traffic. In another embodiment, QoS plug-in 404 provides functionality for identifying traffic via stateful or deep packet inspection. Accordingly, QoS plug-in 404 may include a database or storage element for recording or caching information about a packet, flow, link, and/or a state of a communication link. In one embodiment, QoS plug-in 404 may include a list of applications and functionality for identifying whether a packet is associated with an application in the list of applications. In some embodiments, the applications in the application list are pre-defined, either by a user or administrator of a system, or by the manufacturer of QoS plug-in 404. In other embodiments, QoS plug-in 404 may dynamically recognize applications and add them to the application list. In one embodiment, QoS plug-in 404 may attach or append an application identifier to a packet after identifying an application associated with the packet. The application identifier may comprise a code, name, string, pointer, table or list index, or other identifier to indicate an application in the application list associated with the packet.

In one embodiment, QoS plug-in 404 may provide one or more queues for buffering network packets. In one embodiment, QoS plug-in 404 may provide a plurality of queues with each queue having an associated priority. For example, QoS plug-in 404 may provide a low priority queue, a medium priority queue, and a high priority queue and place packets into the queues responsive to QoS priorities associated with the packets. QoS plug-in 404 may then process the queues in order of priority. For example, in one embodiment, QoS plug-in 404 may process a high priority queue at a faster rate, or more frequently, than the plug-in processes a low priority queue. In another embodiment, QoS plug-in 404 may move packets within a single queue. For example, QoS plug-in 404 may place high priority packets ahead of low priority packets within the queue. In one embodiment, packet priority may be determined responsive to ToS bits, DSCP bits, ICA priority tags, or any other information in the packet. In some embodiments, the QoS plug-in may have a plurality of queues corresponding to each of a number of one or more priorities identified by the protocol, packet or otherwise, such as a number of queues for the number of priorities identified by ToS bits, DSCP bits or ICA priority tags.

In some embodiments, QoS plug-in 404 may include one or more application classifiers. An application classifier may comprise logic, executable code, or other functionality for parsing a network packet received by the QoS plug-in 404, either from an internal source or external source, at a network layer. In some embodiments, QoS plug-in 404 may include a plurality of application classifiers, each operating at a different network layer. Accordingly, the application classifiers may provide multi-level classification of network packets. In one embodiment, a first application classifier, operating at a lower network layer, may classify a received packet as corresponding to a first application and attach an application identifier corresponding to the first application. The application classifier may pass the received packet to a second classifier, operating at a higher network layer, which may classify the received packet as corresponding to a second application. The second classifier, provided with both classifications via the application identifier, may determine the second classification is more appropriate, and may modify the application identifier accordingly. This may be done, for example, to allow for queuing of encrypted network packets for processing by a decryption module. For example, a first classifier may classify an encrypted packet as a TCP packet or UDP packet, but due to the encryption, may be unable to determine an application layer protocol of the packet. However, in some embodiments, a policy may indicate that UDP packets should be decrypted at a higher priority than TCP packets. Accordingly, even though the first classifier may not have access to all of the information in the packet, information relevant to a processing order of a decryption module may be identified, providing for additional prioritized processing and QoS improvements. After decryption, the decrypted packets may be passed to a second classifier to be further identified and classified responsive to a higher layer protocol, still achieving the fine-grained classification of high-level application-based QoS.

Application classifiers may access a list of applications with associated application identifiers. In some embodiments, the applications in the list may be predetermined. In other embodiments, application classifiers may include functionality for recognizing a new application not in the list, and creating a new application identifier. For example, an application classifier may include a parser to identify application data traffic associated with an application sent via a remote desktop protocol or ICA protocol. The application classifier may determine that the application does not have a corresponding application identifier in the list of applications, and may create a new application identifier in the list corresponding to the new application. Application identifiers may include parameters of the application including application name, type, protocol, service class, default policies, ToS, ports, URL, group membership, user, traffic flow, or other information.

Figure 5:
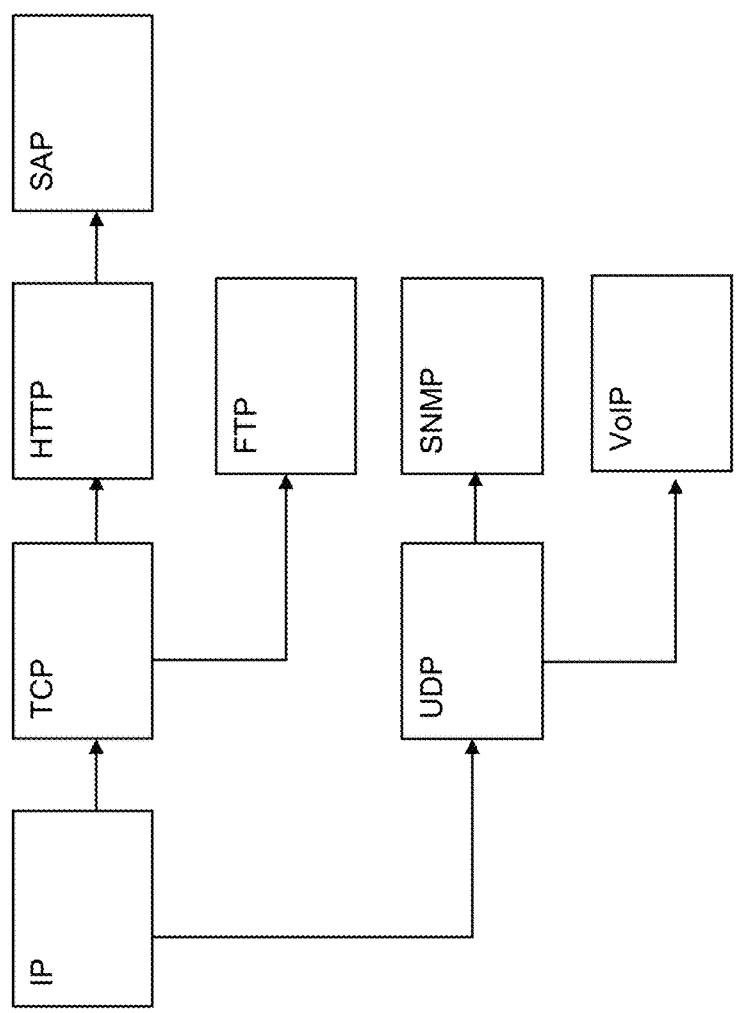
FIG. 5 is a block diagram of an embodiment of parent-child relationships of a plurality of layer 3-7 protocols.

Turning briefly to FIG. 5, illustrated is a block diagram of an embodiment of parent-child relationships of a plurality of layer 3-7 protocols. One skilled in the art may readily appreciate that the parent-child relationships shown may be applied to other protocols, including Appletalk, ICMP, IPX, NetBIOS, SIP, DNS, NTP, POP, IMAP, Telnet, RDP, ICA, or any other type and form of networking protocols. Network packets may be associated with several protocols, which may be parsed along these parent-child relationships. For example, an HTTP network packet is also a TCP and IP packet. In classifying packets, a QoS plug-in 404, network optimization engine 250, or other component may classify a packet at one layer and attach an application identifier. In some embodiments, the application identifier may include a parent identifier. Accordingly, an application classifier parsing a data packet to determine that the packet is, for example, an SAP packet, may attach a first application identifier that indicates the parent is HTTP. In an application identifier list, the protocol HTTP may be identified as having a parent protocol of TCP. Similarly, the protocol of TCP may be identified as having a parent protocol of IP. Accordingly, a single high-level application identifier may identify a plurality of lower-level protocols through these established parent-child relationships. Additionally, groups may be created responsive to these relationships. For example, TCP and UDP both have a parent relationship with IP, and thus may be grouped together as child protocols of IP.

In addition to grouping applications via parent-child relationships, applications may be identified as part of one or more predetermined groups. Predetermined groups may include, for example, web services, file delivery, directory services, VoIP, email, games, peer-to-peer applications, client-server applications, routing protocols, security protocols, or other information. An application identifier may indicate that the application is part of several groups via one or more flags. For example, an application identifier may include a plurality of flags to indicate that an application is a web-based peer-to-peer multimedia file transfer utility using an IP protocol. In one embodiment, the application identifier may use a field with one or more bits set to indicate membership in the one or more groups. For example, in some embodiments, applications may be identified as belonging to one or more of the following groups:

| Group ID | Definition | Group Name |
| --- | --- | --- |
| 1 | APP_GROUP_WEB | Web |
| 2 | APP_GROUP_EMAIL_COLLAB | Email and Collaboration |
| 4 | APP_GROUP_CITRIX | Citrix Protocols |
| 8 | APP_GROUP_DIRSVCS | Directory Services |
| 16 | APP_GROUP_CONTENT_DELIVERY | Content Delivery |
| 32 | APP_GROUP_FILESERVER | File Server |
| 64 | APP_GROUP_GAMES | Games |
| 128 | APP_GROUP_HOST_ACCESS | Host Access |
| 256 | APP_GROUP_VOIP | Voice Over IP (VOIP) |
| 512 | APP_GROUP_LEGACY_NON_IP | Legacy Or Non-IP |
| 1024 | APP_GROUP_MESSAGING | Messaging |
| 2048 | APP_GROUP_MULTIMEDIA | Multimedia |
| 4096 | APP_GROUP_NETMGMT | Network Management |
| 8192 | APP_GROUP_P2P | Peer-to-Peer (P2P) Applications |
| 16384 | APP_GROUP_ROUTING | Routing Protocols |
| 32768 | APP_GROUP_SECURITY | Security Protocols |
| 65536 | APP_GROUP_SESSIONS | Session |
| 131072 | APP_GROUP_SERVERS | Servers |
| 262144 | APP_GROUP_INFRASTRUCTURE | APP_GROUP_INFRASTRUCTURE |
| 524288 | APP_GROUP_MIDDLEWARE | Middleware |
| 1048576 | APP_GROUP_GENERAL | General Classifiers |
| 2097152 | APP_GROUP_DB_ERP | Database and Enterprise Resource Planning (ERP) Software |
| 4194304 | APP_GROUP_CLIENT_SERVER | Client-Server |
| 8388608 | APP_GROUP_IP | IP Protocols |

In some embodiments, application definitions may include: a unique identifier to identify the application; an identifier of a parent application in the application list; a unique application name; a long name or description of the application; a composite group ID, as discussed above; a classifier identifier, such as a network, transport, session or application level classifier module used for classifying traffic; a next classifier identifier, for embodiments in which multiple classifiers may be required to classify traffic; a flag to indicate if the application is capable of being accelerated; a flag to indicate whether the definition has been modified; and a vector array of application parameters. These application parameters may be defined dynamically. For example, in some embodiments, the vector array of application parameters may include a name of a parameter, such as "port"; a type of parameter, such as "unsigned int" or "string"; a value of the parameter, to be evaluated based on the type; minimum and maximum values of the parameter, if any; and a flag to indicate whether the parameter is user editable. Multiple parameters may be defined for an application.

Returning to FIG. 4A, client agent driver 406 may comprise a driver, library, API, service, or other interface for communication between a client agent 120 or components of a client agent, discussed above in more detail, and plug-in framework 402. In some embodiments, the client agent driver comprises any embodiments of the client agent 120. Because kernel-mode components and user-mode components may use different structures and objects, in one embodiment, client agent driver 406 may comprise a translation library or API for allowing a network optimization engine 250 or components of the network optimization engine to communicate with plug-in framework 402 and/or QoS plug-in 404.

In some embodiments, kernel-mode components may interact, communicate, or exchange data with elements operating in user-mode 303 via a shared memory pool 408 and/or an IO control channel 410. In one embodiment, shared memory pool 408 may comprise a predetermined memory structure or location accessible by both kernel-mode components and user-mode components. In some embodiments, such memory structure or location may include locking functionality, such as a semaphore, flag, or mutex, for preventing components accessing the shared memory structure from interfering. In one embodiment, an IO control channel 410 may comprise a communications channel between various components of the system, such as a shared communications bus or virtual channel for system calls.

In some embodiments, such interaction, communication, or exchange of data via shared memory or IO control channel may include commands or methods for:

Gathering information about a kernel level driver or specified network adapter;

Mapping a specified memory region for communicated via shared memory;

Allocating memory or buffers for interaction;

Passing information about shared data structures from user-mode to kernel-mode;

Directing a kernel-mode driver to check for a number of packets to be sent, and retrieving numbers of pending send and receive requests;

Retrieving counter information, names, or values;

Resetting one or more counters;

Setting or retrieving a debug level;

Enabling or disabling collection of information for packet tracing, including setting or retrieving an address mask for packet tracing;

Retrieving the contents of a buffer from the driver;

Enabling routing controls, including bypassing any traffic received from the input adapter, setting a virtual inline mode to either pass traffic to a network stack or return traffic to a sender, or discarding all traffic;

Receiving NDIS WAN adapter addresses; and

Setting parameters for interframe delay, cache sizes, virtual memory, or any other parameters.

In some embodiments, reporter 412 may comprise a service, function, module, subroutine, logic, or other executable code for requesting and collecting data, and creating reports or reporting objects. In some embodiments, reporter 412 may include an interface for requesting information from QoS plug-in 404, including statistics of dropped packets and bytes, transmitted and received packets and bytes, latency, buffer size, and other information. In one embodiment, reporter 412 may request such information at regular intervals, while in another embodiment, reporter 412 may request the information responsive to a trigger, such as a user request. In some embodiments, the interval may be configured by a user or administrator.

In one embodiment, reporter 412 may collect data at a plurality of different levels or scopes. For example, in one such embodiment, reporter 412 may collect data specific to one or more QoS policies; one or more applications; one or more service classes; one or more links; or system-wide data. Accordingly, this data may be provided in reports focused on each level or scope. In some embodiments, system-wide data may include historical accelerated and un-accelerated data, allowing a user or administrator to determine the system efficiency gained through acceleration. Because multiple links may be configured per network adapter, and traffic received via one link may be transmitted to multiple links, reporter 412 may collect data per link individually and aggregate the data to provide a complete overview of network traffic. Similarly, reporter 412 may collect application-specific data to provide a user or administrator with an improved understanding of traffic flow to and from applications. For example, reporter 412 may collect and display data sorted by application in order of: traffic sent; traffic received; packets sent; packets received; total traffic sent; total traffic; and total packets.

Likewise, in some embodiments, reporter 412 may collect and display data associated with a QoS policy, for each policy, on a per link basis. In other embodiments, reporter 412 may collect and display data associated with one or more service classes, including rates of traffic, and statistics by service class per link.

In some embodiments, historical data may be retained at varying levels of granularity, including once per second, once per minute, once per 5 minutes, once per hour, once per two hours, once per day, or any other value, and may be retained for varying durations, including one minute, one hour, one day, one week, and one month. In some embodiments, reporter 412 may retain multiple concurrent sets of historical data of varying duration and granularity.

In one embodiment, reporter 412 may create one or more reporting objects responsive to an acceleration or QoS policy. Objects may be created specific to one or more of traffic direction, object type, unique identifiers of the policy, or parent objects. Reporter 412 may collect. For each object, in one embodiment, reporter 412 may collect statistics or data including a number of bytes or packets processed by the policy, a number of discarded bytes or packets, and a number of dropped bytes or packets. Such packets or bytes may be dropped or discarded due to blocking or regulation policies.

Reporter 412 may include one or more APIs or XML-RPC methods, which, in some embodiments, may be applied to various reporting objects, statistics, or collected data discussed above, such as: getting a sorted list of applications in order of statistics or counters for the object, such as a list of dropped packets per application; getting a sorted list of all applications in a specified group in order of statistics or counters for the object, such as all HTTP applications, or all applications associated with Google; getting report data for a specific link; getting report data for a specific service class; or getting report data for a specific QoS policy. Such reports, in one embodiment, may be output as an XML file or array of link name and counter statistic pairs. Furthermore, for managing reports and counters, reporter 412 may include XML-RPC methods for resetting one or more application counters, link counters, service class counters, or QoS policy counters.

Because a lot of data may be stored in extended performance counters, which some reporting objects may not use, in some embodiments, reporter 412 uses selective data collection and reporting. In these embodiments, each reporting object may include one or more flags for relevant data, such as bytes, packets, bytes discarded, packets discarded, bytes dropped, packets dropped, and may collect and report only flagged data. In another embodiment, the reporting object may include a flag indicating to collect and report all data.

In some embodiments, reporter 412 may include or manage counters for transmitted dropped packets; received dropped packets; NIC stops; receive buffer drops; outbound packets filtered by a copy or clone setting; traced packets or packets not included in a trace; received packets; packets dropped from a queue; filters that cannot be allocated in memory; NIC no carrier indicators; timeout indicators; stops or timeouts; packets received, dropped, or received with padding while in a loopback mode; received or transmitted packets, bytes, errors, dropped packets; multicast packets received or transmitted; collisions detected; receive length errors; receive oversize errors; receive CRC errors; receive frame errors; receive buffer FIFO errors; receive buffer missed packet errors; transmission aborted errors; transmission carrier loss errors; transmission buffer FIFO errors; transmission heartbeat errors; transmission window errors; or number of compressed packets or bytes transmitted or received.

In other embodiments, reporter 412 may include or manage counters associated with a plug-in framework for a number of bytes or packets received from a network stack; a number of bytes or packets received from the stack and passed to a filter; a number of bytes in IPSec packets or number of IPSec packets received from the stack; a number of bytes or packets received from network adapters; a number of bytes or packets received from adapters and passed to a filter; a number of bytes in IPSec packets or number of IPSec packets received from adapters; a number of packets dropped; a number of packets received, passed to a filter, and/or dropped by protocol; a number of trace packets dropped; a number of packets lost; a number of packets dropped from a transmission queue; a number of times a packet could not be removed from a transmission queue or was dropped due to stalls; adapter connects, disconnects, or failures; or number of times that an adapter went up, down, or into standby.

In some embodiments, counters may be specific to an adapter, or on a per-adapter basis, and may include packets received or transmitted; bytes received or transmitted; packets or bytes dropped from a transmission queue; and packets or bytes dropped from a receive buffer.

Similarly, to enhance the usability of reports, reporter 412 may apply a filter to data prior to generating reports. In some embodiments, reporter 412 may filter relevant data based on counters, such as bytes, packets, bytes discarded, packets discarded, bytes dropped, packets dropped, or all data. In other embodiments, reporter 412 may filter relevant data based on time, such as data collected within the last minute, last hour, last day, last week, last month, or all data. In still other embodiments, reporter 412 may filter relevant data based on flow or traffic direction, including inbound, outbound, or both. In yet still other embodiments, data may be collected as both a counter value and a rate of change, and reporter 412 may filter data by type, including value, rate, or all. In other embodiments, reporter 412 may filter data by reporting only a specified number of active objects, such as the top ten most active applications, the top five links dropping the most inbound packets, or any other number of objects. In still other embodiments, reporter 412 may filter data by application group, such as all applications belonging to the group "games". In yet still other embodiments, reporter 412 may filter data by link, such that reporter 412 may report only statistics for a specific link. In many embodiments, multiple filters may be applied. For example, in one such embodiment, reporter 412 may report the rate of dropped bytes per second of inbound data for an email application over the past hour for link #3. Reporter 412 may, in some embodiments, sort the data prior to reporting.

Policy library 414 may comprise a library, database, registry, data file, or other data storage element for storing, modifying, and retrieving one or more policies for use by network optimization engine 250 and/or QoS plug-in 404. In one embodiment, policy library 414 may include default parameters, which may be stored in a default policy file 416. These policies may be applied by network optimization engine 250 and/or QoS policy 404 to packets, flows, or links. In one embodiment, management functions, discussed in more detail below may be treated as services accessed via an internal or virtual link. In these embodiments, to avoid processing packets directed to these functions with compression, encryption, QoS, or other acceleration features, policy library 414 may apply a policy to each of one or more external or non-management links, indicating that traffic on each of the one or more external or non-management links should be sent to an accelerator function. Similar policies may be used for various types of traffic, including address resolution protocol traffic, generic routing encapsulation traffic with non-internal destinations, or other types of traffic that should not be processed by one or more acceleration features of network optimization engine 250.

In one embodiment, a QoS policy may include one more actions to be applied when traffic matches one or more filter conditions of the policy. In one embodiment, an action to be applied may include regulating or limiting the bandwidth of the traffic matching the filter condition. In a further embodiment, an action may include regulating or limiting the bandwidth of the traffic at different levels, depending on direction of flow. For example, a policy may indicate to limit inbound traffic to a first rate, and limit outbound traffic to a second rate. In another embodiment, an action to be applied may be to process traffic matching the filter condition at a minimum latency, or as fast as possible, which may include prioritizing the minimum latency traffic ahead of other traffic, or buffering or delaying other non-minimum latency traffic. In another embodiment, an action to be applied may be to block traffic matching the one or more filter conditions.

In yet another embodiment, an action to be applied may be to process the traffic according to a priority level. In some embodiments, multiple priority levels may exist including three (high, medium, low); five (high, high-medium, medium, low-medium, low); seven (very-high, high, high-medium, medium, low-medium, low, very low); or any other number. In one embodiment, numerical priority values may be used for each level. For example, in one embodiment, priority levels of 10, 20, 30, 40, 50, 60, and 70 may correspond to the seven priority levels discussed above. However, other values may be used, providing coarser or finer divisions as necessary. In some embodiments, a priority level of medium may be used when there is no priority specified in a policy. In some embodiments, priority levels may exist for background traffic. Processing the traffic according to the priority level may, in some embodiments, comprise processing traffic at varying rates or frequencies according to priority, or performing other acceleration functions, described herein.

In still another embodiment, an action to be applied may be to mark a network traffic packet matching the one or more conditions with ToS bits for management by intelligent switches and QoS-enabled routers. In another embodiment, the action may be to mark the packet with DSCP bits. In yet still another embodiment, the action may be to mark the packet with an ICA priority tag.

As discussed above, policies may be applied to packets that match one or more filter conditions. In some embodiments, these filter conditions may include an application name, type or identifier, a port, a direction of flow, a local IP address, a remote IP address, a VLAN ID, a DSCP setting, a priority, a packet size, a Web Cache Communication Protocol (WCCP) service group ID, or any other type of information. Filter conditions may include an order of precedence of application, such that one condition with a high precedence may be applied before a condition with a low precedence. In some embodiments, a user or administrator of a system may adjust the precedence of one or more filter conditions.

Figure 4B:
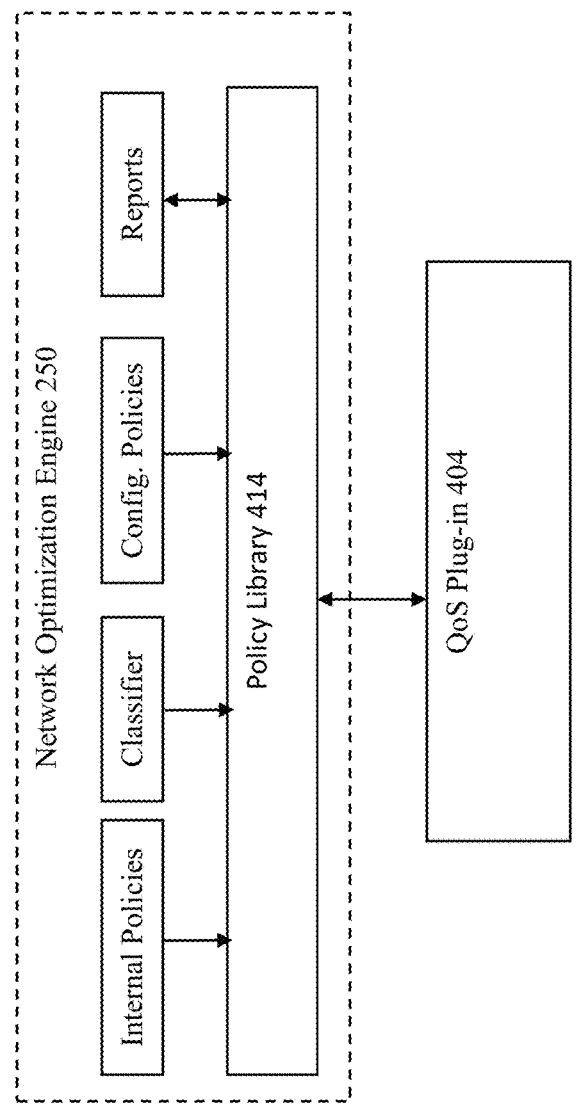
FIG. 4B is a block diagram of an embodiment of a network optimization engine for providing multi-level classification of a network packet.

Referring briefly ahead to FIG. 4B, illustrated is a block diagram of an embodiment of a network optimization engine for providing multi-level classification of a network packet. Policy library 414 may provide for translation or conversion from data structures useable by QoS plug-in 404 to those useable by network optimization engine 250 or other user-mode components. In some embodiments, such translation or conversion may be provided via one or more classifiers, configuration policy translators, and report translators. Classifiers may be used by QoS plug-in 404 or network optimization engine 250 to define and classify applications. Classifiers may be updated by policy library 414 responsive to changes in definitions of applications. Similarly, configuration policy translators may be created responsive to link policies, service class policies, and/or QoS policies. For example, rules in a service class filter and actions in a QoS policy may be used to build a policy, which may be passed to QoS plug-in 404 using the translator. Similarly, data for reports, discussed in more detail above, may be collected or processed using a translator provided by policy library 414.

In some embodiments, discussed in more detail below, a classifier may comprise an application, program, module, service, daemon, subroutine, logic, functionality, or other executable code for classifying a packet as corresponding to an application. In one embodiment, a classifier may include a parser for detecting or locating information in a packet identifying the packet as corresponding to the application. In another embodiment, a classifier may include or manage an application list with one or more applications and one or more corresponding application identifiers. In a further embodiment, discussed in more detail below, the application list may include information of a parent-child relationship with another application. In another further embodiment, discussed in more detail below, the application list may include group membership information of an application. In some embodiments, the classifier may include functionality for parsing a packet for information identifying a new application not in the application list, and adding the new application to the application list and establishing a new application identifier for the new application.

In some embodiments, for QoS and acceleration to work together, link and service class policies need to be set up in a policy tree. In one embodiment of such a tree, two link policy objects may be created for each link, one for each direction (inbound and outbound). Service class policies may be created under each link policy. Thus, when a packet arrives, the packet may be classified, statistics may be gathered for reporting, and QoS or acceleration actions may be applied.

Returning to FIG. 4A, in some embodiments, network optimization engine may include an XML-RPC listener 420, a telnet listener 422 and/or an SNMP agent 424. XML-RPC listener 420, telnet listener 422, and SNMP agent 424 may comprise one or more services, functions, subroutines, daemons, applications, or other executable code for monitoring communications between network optimization engine 250, management functions 428, and configuration storage 418. For example, SNMP agent 424 may provide processing and transmission of SNMP management data and commands, either internally or via a network connection. XML-RPC listener 420 may interface with an XML-RPC client 426 which may, in some embodiments, comprise a web browser, a shell, terminal or any other type and form of client interfaces for processing XML-RPC calls or other HTTP, PHP, or similar traffic. In one embodiment, XML-RPC client 426 may interface to a WMI provider or other management interface for automation and monitoring.

In some embodiments, network optimization engine 250, QoS plug-in 404 and/or client agent driver 406 may include or communicate with a license module. In one embodiment, if the license module detects that the product is not licensed, one or more filter or QoS policies may be disabled, such that network traffic is unprocessed.

Deployment Examples and Service Class and Policy Definitions

The system shown in FIG. 4A may be deployed in various embodiments, including as part of an intermediary device such as a router, network switch, firewall, network bridge, or other device, or as part of a client or a server. In these various embodiments, network ports of the system may be used together for bridging or routing from one network segment to another, or may be used separately. In these embodiments, the system may communicate with other routers via normal routing, policy-based routing, web cache communication protocol (WCCP) routing, or any other routing mechanism. For example, the system may be deployed in a direct or end-point mode, an in-line or virtual in-line (VI) mode, a routed mode, a WCCP mode, a proxy mode, a tunnel mode, or in any other deployment mode.

In these embodiments, NIC ports or adapters may use multiple links, as discussed above. Each link may be identified by one or more configuration parameters. These parameters may include a link ID, which may be an internal index or unique ID; an adapter name, which may be defined by a user or administrator or generated automatically; a link type identifier, which may be used to define a link object type, such as LAN, WAN, site, or any other type; one or more filter rules to be applied to the link; maximum inbound link speed or bandwidth in bps or any other metric; maximum outbound link speed or bandwidth in bps or any other metric; and an order in which policies or communications associated with the link are processed, such that higher order policies may be processed before lower order policies. In some embodiments, the parameters may be modifiable by a user or administrator of the system, and the parameters may include a modified flag set to, a zero value in some embodiments, or a non-zero value in other embodiments, to indicate the policy has been modified.

To support QoS in different network topologies, configurations and deployment modes as discussed above, each link definition or identification may further include one or more filtering parameters, including one or more IP addresses, adapter names, ethernet addresses, VLAN IDs, WCCP service group IDs, or any other identifier. In some embodiments, each link may include a single entry for IP addresses and/or ethernet addresses, such that there is no differentiation between source and destination addresses. In one such embodiment, the addresses may be used as source or destination addresses based on the direction of a link policy—i.e. inbound or outbound. For example, a link with an address of 1.2.3.4 may have a filter policy for inbound traffic that is applied to traffic with a destination IP of 1.2.3.4, and a filter policy for outbound traffic that is applied to traffic with a source IP of 1.2.3.4. In some embodiments, IP addresses may be specified or defined in different formats, including dotted strings, arrays of bytes, and/or integer values.

In one embodiment, links may be managed through one or more remote procedure call commands or methods, as discussed above. These methods may include commands for creating a link, renaming a link, deleting a link, changing a link, getting parameters of a link, resetting one or more counters associated with a link, or getting statistics or counter values from the one or more counters associated with the link. Further commands may be associated with the methods for use in a CLI or other interface, including commands for displaying link statistics in one or more formats, such as XML; displaying or dumping characteristics of a link in one or more formats, such as XML; displaying or dumping cached characteristics of a link in one or more formats, such as XML; displaying a list of current links or applications utilizing links; and resetting one or more counters associated with a link. In one embodiment, link definitions may be stored in a parameter file in a format, such as XML. These definitions may, in some embodiments, be first created during initialization. The hierarchy afforded by XML may be used, for example, to denote policies or service classes associated with links in both inbound and outbound modes:

Link—1 (Inbound)
Service Class—1
Service Class—2
Service Class—n
Link—1 (Outbound)
Service Class—1
Service Class—2
Service Class—n
Link—2 (Inbound)
Service Class—1
Service Class—2
Service Class—n
Link—2 (Outbound)
Service Class—1
Service Class—2
Service Class—n Service classes, in some embodiments, may be used to differentiate between priorities of traffic. As discussed above, DSCP bits may be used to denote service classes, with each class being a group of DSCPs with the same precedence value. Values within a class may offer similar network services, but with slight differences (such as "gold", "silver" and "bronze" performance sub-classes). As discussed above, IETF RFC 2474 describes some service classes via code numbers. In some embodiments, DSCP bits may be mapped to some or all of these code numbers to ensure compatibility with RFC 2474-compliant switches, as shown below:

| Class | DSCP Class | RFC 2474 Class | Code | Precedence | Value |
|---|---|---|---|---|---|
| Best Effort | Best Efforts | | 0 | 0 | 0 |
| Class 1 | | | 8 | | |
| | Class 1 - Gold | AF11 | 10 | 1 | 40 |
| | Class 1 - Silver | AF12 | 12 | | 48 |
| | Class 1 - Bronze | AF13 | 14 | | 56 |
| Class 2 | | | 16 | 2 | 64 |
| | Class 2 - Gold | AF21 | 18 | | 72 |
| | Class 2 - Silver | AF22 | 20 | | 80 |
| | Class 2 - Bronze | AF23 | 22 | | 88 |
| Class 3 | | | 24 | 3 | 96 |
| | Class 3 - Gold | AF31 | 26 | | 104 |
| | Class 3 - Silver | AF32 | 28 | | 108 |
| | Class 3 - Bronze | AF33 | 30 | | 120 |
| Class 4 | | | 32 | 4 | 128 |
| | Class 4 - Gold | AF41 | 34 | | 136 |
| | Class 4 - Silver | AF42 | 36 | | 144 |
| | Class 4 - Bronze | AF43 | 38 | | 152 |
| Express Forwarding | Express Forwarding | | 40 | 5 | 160 |
| Expedited | Expedited Forwarding | | 46 | | 184 |
| | Discard | | | | 4 |
| Control | Internetwork Control | | 48 | 6 | 192 |
| Control | Network Control | | 56 | 7 | 224 |

Similarly, other priority codes may be mapped to one or more service classes. For example, in some embodiments, ICA priority tags may include the values 0-3, representing high, medium, low, and background tasks, which may be mapped to one or more DSCP bits or other service class levels.

In some embodiments, QoS policies may include multiple parameters including: a unique identifier to identify a policy action; one or more action flags to identify which actions are used with the QoS policy, such as blocking, providing bandwidth limiting or regulation, providing traffic with minimum latency, etc., as discussed above; a unique QoS policy name; a priority level; a service bits setting to change ToS or DSCP bits of a packet processed according to the policy; a maximum input and/or output bandwidth; an ICA priority value or other protocol priority value to include with the packet; and a flag indicating whether the policy has been modified.

In some embodiments, different actions such as acceleration, QoS, reporting and classification may be applied to packets based on service class. In one embodiment, reporting and classification actions may be implicit, or may be required for all service classes. Thus, in this embodiment, only two options—QoS and acceleration—may be reported to a user or administrator or provided as configuration options. In some embodiments, acceleration actions may be based on the applications included in a service class definition. For example, a service class may only be accelerateable if it includes applications capable of being accelerated. Not all service classes are relevant for acceleration, depending on the application or applications used to define a service class. Some dynamic protocol applications can't be configured for acceleration. Thus, options may be provided in a configuration tool for a user or administrator to select acceleration and/or QoS tasks to be utilized for a class. In some embodiments, some statistical parameters such as compression ratio or accelerated vs. un-accelerated traffic will not be available for classes not selected for acceleration usage. In one embodiment, when an option for acceleration usage is selected, the configuration tool may only display the list of applications which can be accelerated. In some embodiments, the configuration tool may include a mechanism to find which applications can be accelerated.

In some embodiments, service classes may include or be defined by parameters, such as a unique identifier for the service class; a precedence order for processing of the policy related to the service class; one or more flags of supported policies; one or more filter rules in an ordered list; one or more QoS policies, which, in one embodiment, may comprise an array of values of policy identifier and link identifier pairs; one or more acceleration policies; a flag identifying if the service class has been modified; and a flag that may be set to enable or disable the service class, without deleting the parameters from the device configuration. In some embodiments, acceleration policies may include flow control, disk based compression, and memory based compression. QoS policies may be separately defined within a service class parameter, and may be associated with multiple service classes.

In some embodiments, XML-RPC commands and methods may be used to manage service classes. These commands and methods may include commands for: creating a service class; renaming a service class; deleting a service class; changing a service class parameter or parameters; getting or retrieving a service class parameter or parameters; resetting one or more counters associated with the service class; getting or retrieving one or more counter values or statistics associated with the service class; setting an acceleration policy or policies for the service class; setting a QoS policy or policies for the service class; updating an order of precedence of the service class; and changing an enabled or disabled state of the service class. Commands for a CLI or other interface may include commands to display a list of current service classes; display entries in an index table of service classes; display service class statistics, in one or more formats, such as XML; convert or output a service class definition in XML; retrieve a cached XML definition of a service class; reset a service class driver; reverse a service class index, to control order of application; dump connection information of connections associated with a service class; and reset one or more service class counters. In one embodiment, the service class list may be stored in an XML file, and may be created as a default list during initialization. In some embodiments, default service classes may be hard coded, while in others, they may be generated responsive to presence of one or more applications or components during initialization.

In some embodiments, a system such as that shown in FIG. 4A may comprise functionality for disabling one or more features. This may be helpful, particularly for testing purposes. In some embodiments, one or more acceleration policies and/or one or more QoS policies may be disabled, without deleting them from an active configuration. In one embodiment, disabling policies may be controlled a system state parameter, such that QoS policies and/or acceleration policies may be enabled or disabled based on the setting or unsetting of a predetermined bit, such as a first bit for QoS policies and a second bit for acceleration policies. In a further embodiment, an XML-RPC method may be used to get a current state of system features, such as QoS or acceleration being enabled or disabled; or used to set a current state by changing the value of the predetermined bit or bits.

In some embodiments, the system may include functionality for processing encrypted traffic, discussed in more detail below in connection with FIG. 8. For example, in one embodiment, the system may decrypt, compress, and re-encrypt SSL traffic. Service classes may be utilized with SSL traffic by filtering SSL traffic based on one or more characteristics, such as destination port, SSL server address, and source IP address. As discussed above in connection with FIG. 4A, a system including a reporter 412 may collect and report statistics associated with SSL traffic. To provide per-application level statistics, in some embodiments, the reporter may use a multi-level classification method, such as the one discussed in more detail below in connection with FIG. 8, to classify SSL traffic as associated with or corresponding to an application. Per-application statistics may then be collected and reported for the encrypted traffic, along with statistics for unencrypted traffic. For example, in one such embodiment, a service class may be defined for messaging API (MAPI) traffic, with a filter of an SSL server IP and port address, and traffic associated with that IP and port may be classified as MAPI traffic. If another service class includes a MAPI-enabled application, such as Microsoft Outlook, the encrypted traffic may be reported along with unencrypted traffic associated with the MAPI-enabled application. Conversely, if no service classes include MAPI-enabled applications, then in some embodiments, the encrypted traffic may be reported as unclassified TCP traffic. Accordingly, it may be preferable to configure an application-specific service class along with the SSL service class.

In some embodiments, a system may include a default configuration with default link and service classes that a user or administrator may be prevented from deleting. For instance, default link and service classes may be used, in some embodiments, as templates for constructing new links and service classes, and accordingly shouldn't be deleted. Accordingly, in these embodiments, service classes, links, policies and/or other objects may include one or more flags or predetermined bits set to indicate one or more of: the user is not allowed to delete the object; the user is not allowed to edit the object definition; the user is not allowed to change the order of the object; the user is not allowed to change the QoS policy and/or actions for the object; and the user is not allowed to change the acceleration policy for the object. Each flag may be represented by an independent bit in a string, such that multiple flags may be independently set.

In some embodiments, other defaults may be utilized, too. For example, the system may include default maximum queue depths for packet queueing, and maximum number of entries and/or table size values for reporting application, link, service class, or other statistics. In some embodiments, the system may also include preconfigured filter rules, such as a rule to send all TCP traffic to the QoS plug-in and/or network optimization engine 250 for classification and/or further processing. This may be done, for example, to avoid additional processing of management interface traffic. In other embodiments, the system may include a rule to direct generic routing encapsulation (GRE) tunneled traffic to the QoS plug-in. For example, one rule may indicate that all GRE traffic, whether TCP or UDP, that is not web cache communication protocol traffic may be passed to the QoS plug-in or network optimization engine for classification or further processing. Another rule with a higher precedence may also be used to intercept GRE WCCP traffic. In one embodiment, such a rule may be applied only to incoming traffic directed to a hosted IP address.

In one embodiment, internal address resolution protocol (ARP) or "pseudo-ARP" messages may be utilized to identify the proper adapter to use for specified traffic. In such embodiments, the system may include a preconfigured rule to intercept outbound TCP synchronization (SYN) packets on a predetermined port, such as 5555, for passing to a QoS plug-in or network optimization engine. Once the packet is passed to one of these modules, the module may use MAC information in the packet to identify an adapter and update an ARP table. To ensure that the SYN packet does not result in a hanging connection, the module may reply with an RST packet back to the original socket to terminate the connection.

Other preconfigured policies that may exist in some embodiments include an exclude policy, in which specified traffic is dropped. In one embodiment of a system with such a policy, traffic matching a filter set may have a policy applied, with the policy lacking any action that causes the traffic to be sent to a QoS plug-in or network optimization engine. Accordingly, by placing this policy first in precedence, the traffic may be excluded from further processing. Filters that may be used, in some embodiments, include predetermined port numbers, such as 3389 for RDP terminal services; 80 or 443 for HTTP communications; 22 for SSH; 23 for telnet; or other ports, including those used for internal XML-RPC protocol messages. In other embodiments, the filters may include source or destination IP addresses matching hosted IP addresses of the system, such as loopback addresses or internal configuration addresses. In still other embodiments, in which the system uses virtual IP (VIP) addresses, filters may be used to exclude TCP traffic with source or destination IP addresses matching virtual IP addresses. In yet still other embodiments, in which the system interacts with another system to provide high availability (HA) services, filters may be used to exclude HA management traffic with source or destination IP addresses matching IP addresses hosted on an HA management adapter.

In some embodiments, for managing signaling channel traffic between a client and appliance or applications on the system, the system may include a preconfigured signal channel policy. In one such embodiment, outbound traffic from a signaling channel IP and port may be redirected back and inbound traffic to the signaling channel IP and port may be directed to a QoS plug-in or network optimization engine.

In some embodiments, the system may include a preconfigured policy to apply QoS to UDP traffic without performing acceleration techniques on the traffic. For example, in systems that serve as a proxy for UDP traffic from a WCCP router, MAC and IP addresses may be flipped to allow content routing for real-time redirection of traffic flows. Accordingly, in one embodiment, the system may include a filter that intercepts UDP traffic with destination MAC addresses matching a system interface and destination IP address not matching an interface, and passes the traffic to a QoS plug-in for prioritization.

In some embodiments, the system may include bandwidth management functionality. In an embodiment of aggressive bandwidth management, the system may ignore conventional congestion-control and packing signals. For example, the system may resend packets in response to packet loss, but not reduce transmission rates; and/or may not use a slow-start protocol, but immediately send packets at the negotiated bandwidth. In some embodiments, the system may ignore self-clocking routines. For example, in one such embodiment, the system may send data to fill a window, such as an 8 MB window, regardless of not receiving any ACK packets. In these aggressive bandwidth management embodiments, a receiver-side QoS system may not be able to slow down a remote sender utilizing these aggressive techniques, without adjusting negotiated bandwidth through TCP options.

Multi-Level Classification of Network Packets

Figure 6:
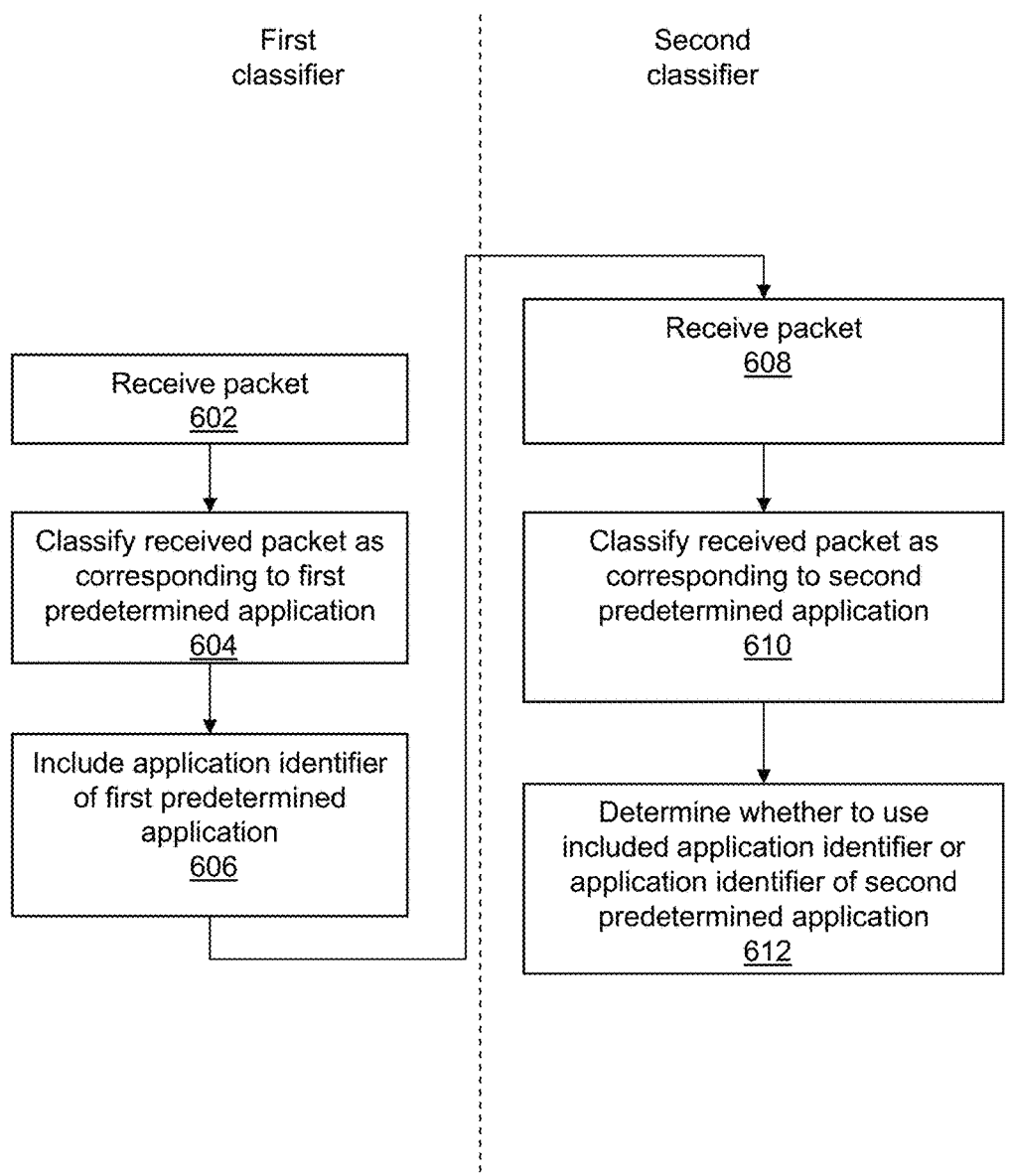
FIG. 6 is a flow chart of an embodiment of a method for providing multi-level classification of a network packet.

Shown in FIG. 6 is a flow chart of an embodiment of a method for providing multi-level classification of a network packet. In brief overview, at step 602, a first classifier may receive a network packet. At step 604, the first classifier may classify the received packet as corresponding to a first predetermined application. At step 606, the first classifier may include an application identifier of the first predetermined application with the network packet. At step 608, a second classifier may receive the network packet. At step 610, the second classifier may classify the received packet as corresponding to a second predetermined application. At step 612, the second classifier may determine whether to use the included application identifier of the first predetermined application, or the application identifier of the second predetermined application.

Referring to FIG. 6, and in more detail, at step 602, a first classifier operating in a first portion of a network stack of a device may receive a packet of network traffic from a network port. In some embodiments, the first classifier may receive the packet of network traffic via an intermediary process, such as a filter of a plug-in framework or network optimization engine discussed above. In some embodiments, the first classifier may operate in a kernel level of the device. In one embodiment, the first classifier may intercept the packet of network traffic. In a further embodiment, the first classifier may intercept the packet at a network layer or portion of the network stack below a transport layer. In such embodiments, the packet may be referred to variously as intercepted or received by the classifier.

At step 604, in some embodiments, the first classifier may classify the received packet of network traffic as corresponding to a first predetermined application. In one embodiment, the first classifier may parse the packet to identify one or more protocols identified within the packet. For example, in one embodiment, the first classifier may identify a network protocol of the packet and classify the received packet as corresponding to a first predetermined application that utilizes the network protocol. In another embodiment, the first classifier may identify other information in the packet, including a protocol type, an application name, a data string, one or more data flags, or any other information that may identify the packet as corresponding to the first predetermined application. In some embodiments, the first classifier may classify the received packet at a network layer of the network stack or below a transport layer of the network stack.

At step 606, in some embodiments, the first classifier may include an application identifier of the first predetermined application with the packet. In one embodiment, including an application identifier with the packet may comprise attaching or appending the application identifier to the packet. In another embodiment, including an application identifier with the packet may comprise adding or modifying a flag or string of a header of the packet. For example, in one such embodiment, the first classifier may add a string to an options field of a protocol header of the packet identifying the application identifier. In other embodiments, the application identifier may be included in an data object that comprises the packet of network traffic. In one embodiment, in which data has been fragmented across a plurality of network packets, data of the packets may be assembled into a contiguous data block and the application identifier may be included with the data block.

At step 608, in many embodiments, a second classifier operating at a layer of the network stack of the device above the first portion of the network stack at which the first classifier operates may receive the network packet. In some embodiments, the second classifier may receive the network packet communicated by the first classifier. For example, in one embodiment, the first classifier may communicate the packet via the network stack to the second classifier. In another embodiment, the first classifier may communicate the packet via the network stack, and the second classifier may intercept the packet. In yet another embodiment, the first classifier may communicate the packet to the second classifier via a memory mapped interface. Thus, in some embodiments, the first classifier may explicitly transfer the packet to the second classifier, while in other embodiments, the first classifier may simply transmit the packet agnostic to further processing or without knowledge of the second classifier's operations. In some embodiments, the second classifier may execute in a user level of the device. In many embodiments, the second classifier may operate on the packet at or above a transport layer of the network stack.

At step 610, in some embodiments, the second classifier may classify the received packet as corresponding to a second predetermined application. In one embodiment, the second classifier may classify the received packet as corresponding to a second predetermined application via content of the packet, at or above a transport layer of the network stack. In one embodiment, the second classifier may parse the packet to identify one or more protocols identified within the packet. For example, in one embodiment, the second classifier may identify an application protocol of the packet and classify the received packet as corresponding to a second predetermined application that utilizes the application protocol. In another embodiment, the second classifier may identify other information in the packet, including a protocol type, an application name, a data string, one or more data flags, or any other information that may identify the packet as corresponding to the second predetermined application. In some embodiments, the second classifier may identify the packet as comprising a remote display protocol, remote desktop protocol or ICA protocol packet and may identify an application associated with application display or control data within the packet as the second predetermined application.

At step 612, in some embodiments, the second classifier may determine whether to use the second classifier's classification of the packet as corresponding to the second predetermined application or the first classifier's classification of the packet identified by the application identifier. In one embodiment, the second classifier may determine that the first predetermined application is more granular than the second predetermined application, and may maintain or utilize the application identifier of the first classifier. For example, in one embodiment, the first classifier may identify network traffic as corresponding to a web application, and the second classifier may identify the network traffic as corresponding to HTTP traffic. In such a case, the first identification of web application may be more granular than the second identification of HTTP, which may include both HTTP web applications and other HTTP data. In one embodiment, granularity may be determined responsive to parent-child relationships of applications and protocols, discussed above in connection with FIG. 5. For example, if a first identifier is a child of a second identifier, then the first identifier may be considered more granular. In other embodiments, the second classifier may determine that the second predetermined application is a more appropriate classification than the first predetermined application, and may replace the application identifier included with the packet with a second application identifier of or corresponding to the second predetermined application. For example, if the identification of the second predetermined application is more granular than the identification of the first predetermined application, then the second classifier may replace the application identifier included with the packet with an application identifier corresponding to the second predetermined application. Once properly classified by either the first application or the second application, various QoS policies may be applied to the packet responsive to the classification.

Auto-Discovery of Applications

As discussed above, an application list may include many predetermined applications. However, in some embodiments of a remote desktop or thin client system, it may be possible that any application could be accessed remotely. Accordingly, network packets of the remote display protocol may include application display data, graphical data, or control data corresponding to an application that is not included in the list of predetermined applications. Thus, it may be valuable for an application classifier to include functionality for recognize and add new applications to the application list.

In one embodiment, application classifiers discussed above may include functions to interact with a list of predetermined applications. For example, in one embodiment, application classifiers may use APIs to create an application definition, with parameters either as a list of parameters, or an XML file. XML-RPC methods may also be used to manage the application list, including methods for: creating an application definition; renaming an application definition; deleting an application definition; changing an application definition setting; getting or retrieving an application definition; getting or retrieving an application definition by name; getting or retrieving an application definition by group identifier; resetting one or more counters associated with an application definition; or getting or retrieving one or more counter values or statistics associated with the application definition. Commands for a CLI or other interface to interact with the application list may include commands for displaying application definition statistics or counter values in one or more formats, including XML; retrieving an application definition in an XML format; retrieving a cached version of an application definition in an XML format; displaying the list of applications, or a list of currently used applications; and resetting one or more counters associated with an application.

Figure 7:
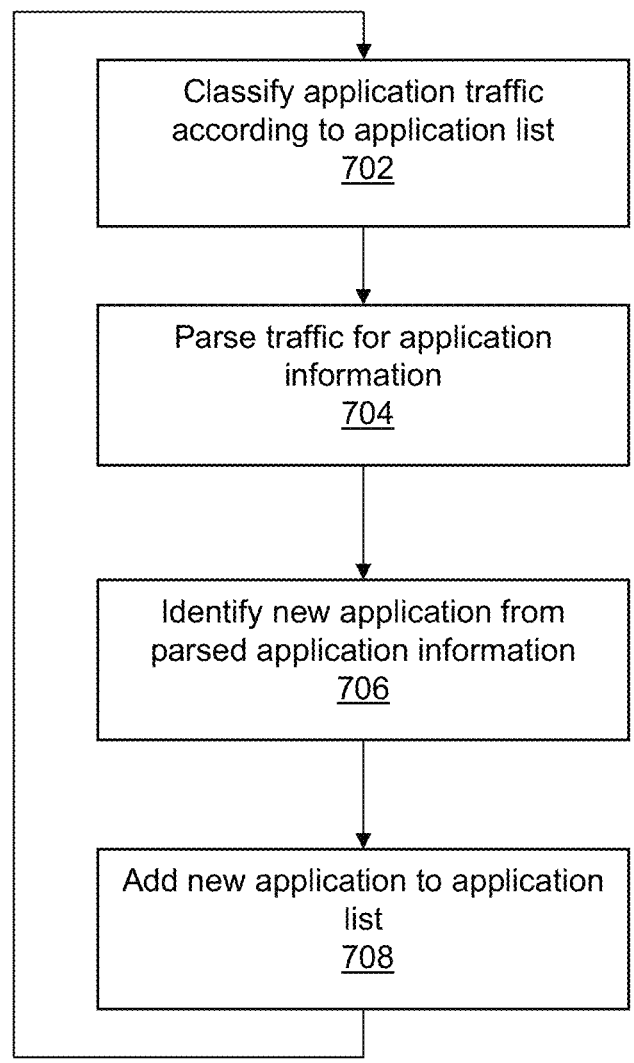
FIG. 7 is a flow chart of an embodiment of a method for discovery of applications via a remote display protocol to include in a list of applications for classification of network traffic.

Referring now to FIG. 7, illustrated is a flow chart of an embodiment of a method for discovery of applications via a remote display protocol to include in a list of applications for classification of network traffic. In brief overview, at step 702, an intermediary device may classify traffic of a remote display protocol according to a list of applications for the remote display protocol. At step 704, the intermediary device may parse the traffic for application information. At step 706, the intermediary device may identify a new application not in the list of applications for the remote display protocol from the parsed application information. At step 708, the intermediary device may add the new application to the list of applications used for classification of remote protocol display traffic. In some embodiments, the intermediary device may then repeat step 702 to reclassify the traffic.

Still referring to FIG. 7 and in more detail, in some embodiments at step 702, a device intermediary to a plurality of clients and a plurality of servers may classify traffic of a remote display protocol according to a list of applications for the remote display protocol. Although referred to generally as a remote display protocol, the protocol may include an RDP protocol, an ICA protocol, a remote frame buffer (RFB) protocol, an X11 protocol, or any other type and form of remote display protocol. The list of applications may be preconfigured by a user or administrator, or, in some embodiments, the list of applications for the remote display protocol may be established during initialization of the device. In one embodiment, the device may establish the list of applications for the remote display protocol responsive to or corresponding to one or more applications published by one or more servers of the plurality of servers for the remote display protocol.

At step 704, in one embodiment, the device may parse the remote display protocol traffic traversing the device for application information of the remote display protocol. In some embodiments, a server of the plurality of servers may publish an application as an application accessible on the server by one or more users via the remote display protocol. In many such embodiments, the server may transmit remote display protocol traffic advertising the newly published application to the one or more users. Upon receiving this traffic, the intermediary device may parse the traffic to identify the newly published application. In other embodiments, the intermediary device may parse remote display protocol traffic for an identifier of an application. For example, in some embodiments, traffic may be sent that identifies an application to be executed, launched, quit, closed, or otherwise interacted with. The device may then parse the traffic to determine the identification of the application.

At step 706, in some embodiments, the device may identify, from the parsed application information, a new application not in the list of applications for the remote display protocol. In one embodiment, identifying a new application may comprise comparing a name of the new application from the parsed application information with names from the list of applications. In another embodiment, identifying a new application may comprise comparing an identifier, a string, a unique ID, or any other information in the parsed application information with corresponding information in the list of applications. In some embodiments, the device may determine that the parsed application information of the remote display protocol identifies an application as the new applications. In other embodiments, the device may determine that the parsed application information identifies an application already in the list of applications. In such embodiments, the device may skip step 708.

At step 708, in some embodiments, the intermediary device may add the new application to the list of applications used for classification of remote display protocol traffic. In one embodiment, the device may establish an application identifier, discussed above, for the new application. In other embodiments, the device may establish a priority for the new application from a plurality of priorities. For example, in one such embodiment, the device may establish the new application as being a high priority application. In a further embodiment, the device may receive remote display protocol traffic for the new application and may classify the remote display protocol traffic according to the established priority. QoS and other acceleration techniques may be performed responsive to the classified priority. In many embodiments, the device may receive further remote display protocol traffic for the new application and may classify the remote display protocol traffic according to classification information for the new application added to the list of applications.

Classification of Encrypted Network Traffic

As discussed above, in many embodiments, a device performing QoS, priority queuing and other acceleration techniques may classify received packets as corresponding to an application, and then apply QoS and other policies associated with the application. However, in many embodiments, packets may be encrypted such that prior to encryption, an application classifier cannot determine the application associated with or corresponding to the packets. One solution may be to not classify packets until after they've been decrypted. However, this may result in all encrypted packets being placed into a decryption queue or buffer regardless of priority. Accordingly, it may be more efficient to decrypt packets in an order dependent on a first classification of the encrypted network packet and reclassify encrypted network traffic after decryption.

Figure 8:
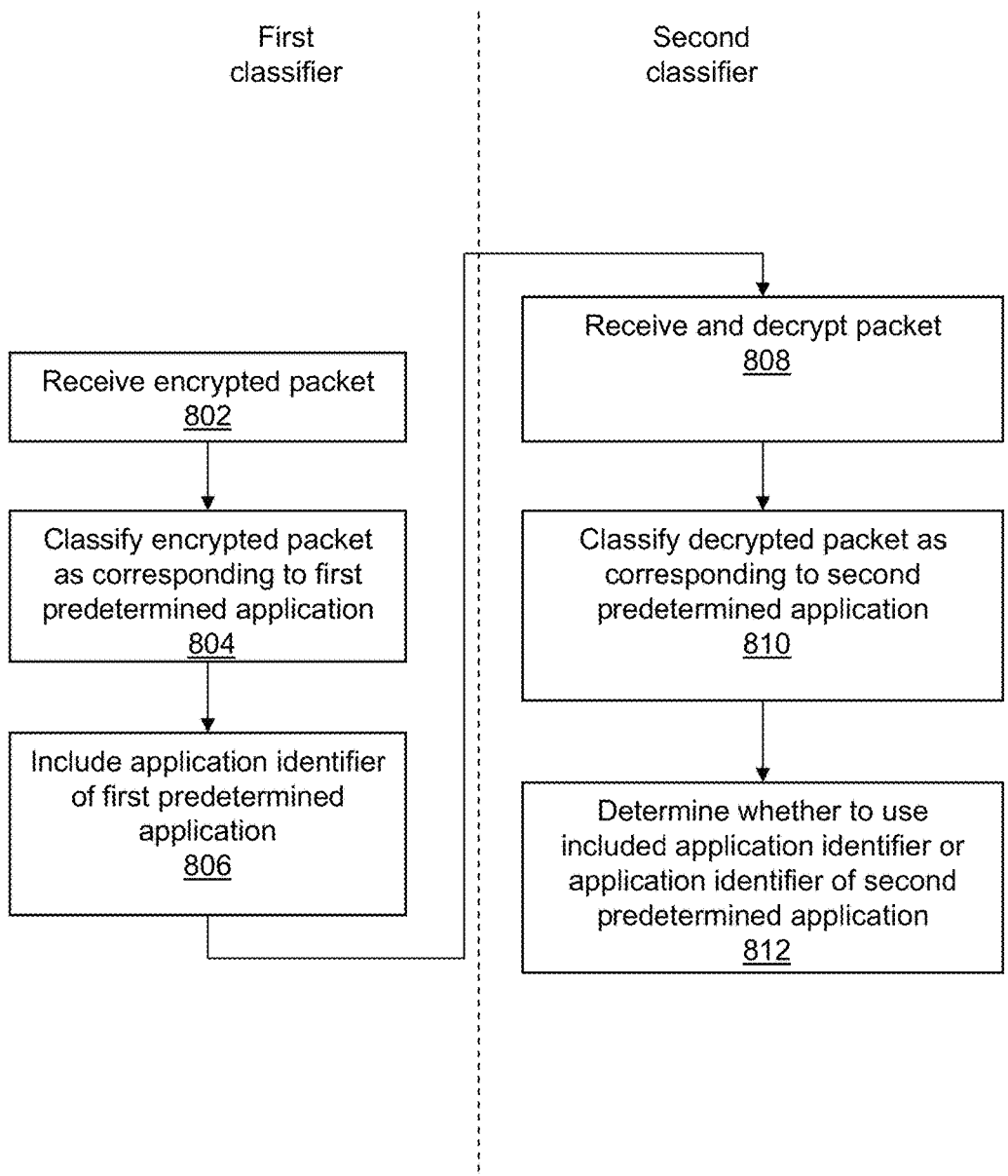
FIG. 8 is a flow chart of an embodiment of a method for providing classification of encrypted network traffic.

Shown in FIG. 8 is a flow chart of an embodiment of a method for providing classification of encrypted network traffic. In brief overview, at step 802, a first classifier may receive an encrypted packet. At step 804, the first classifier may classify the encrypted packet as corresponding to a first predetermined application. At step 806, the first classifier may include an application identifier of the first predetermined application with the encrypted network packet. At step 808, a second classifier may receive and decrypt the network packet. At step 810, the second classifier may classify the decrypted packet as corresponding to a second predetermined application. At step 812, the second classifier may determine whether to use the included application identifier of the first predetermined application, or the application identifier of the second predetermined application.

Still referring to FIG. 8 and in more detail, at step 802, a first classifier operating at a first portion of a network stack of a device may receive an encrypted packet of network traffic via a network port. In some embodiments, the first classifier may receive the packet of network traffic via an intermediary process, such as a filter of a plug-in framework or network optimization engine discussed above. In some embodiments, the first classifier may operate in a kernel level of the device. In one embodiment, the first classifier may intercept the encrypted packet. In a further embodiment, the first classifier may intercept the encrypted packet at a network layer or portion of the network stack below a transport layer. In such embodiments, the encrypted packet may be referred to variously as intercepted or received by the classifier.

At step 804, in some embodiments, the first classifier may classify the received encrypted packet. In one embodiment, the first classifier may classify the encrypted packet as corresponding to a first predetermined application. In one embodiment, the first classifier may parse the packet to identify one or more protocols identified within the packet. For example, in one embodiment, the first classifier may identify a network protocol of the packet and classify the received packet as corresponding to a first predetermined application that utilizes the network protocol. In another embodiment, the first classifier may identify other information in an unencrypted portion of the encrypted packet, such as an IP header, including a protocol type, an application name, a data string, one or more data flags, or any other information that may identify the packet as corresponding to the first predetermined application. In one embodiment, the first classifier may classify the packet based on unencrypted portions of the packet. In another embodiment, the first classifier may receive a packet comprising an encrypted payload and classify the packet based on non-payload content. In another embodiment, a packet may comprise an encrypted packet of a first protocol encapsulated in an unencrypted second protocol, and the first classifier may classify the packet based on the unencrypted encapsulation headers and/or data portions. In some embodiments, the first classifier may classify the received packet at a network layer of the network stack or below a transport layer of the network stack.

At step 806, in some embodiments, the first classifier may include an application identifier corresponding to a first predetermined application identified by the classification with the packet. In one embodiment, including an application identifier with the packet may comprise attaching or appending the application identifier to the packet. In another embodiment, including an application identifier with the packet may comprise adding or modifying a flag or string of a header of the packet. For example, in one such embodiment, the first classifier may add a string to an options field of a protocol header of the packet identifying the application identifier. In other embodiments, the application identifier may be included in an data object that comprises the packet of network traffic. In one embodiment, in which data has been fragmented across a plurality of network packets, data of the packets may be assembled into a contiguous data block and the application identifier may be included with the data block.

At step 808, in many embodiments, a second classifier operating at a second portion of the network stack of the device above the first portion at which the first classifier operates may receive the network packet. In some embodiments, the second classifier may decrypt the packet. In other embodiments, the second classifier may pass the packet to a decryption module, which may decrypt the packet, and return the unencrypted packet to the second classifier. In some embodiments, the second classifier may receive the encrypted packet communicated by the first classifier. For example, in one embodiment, the first classifier may communicate the encrypted packet via the network stack to the second classifier. In another embodiment, the first classifier may communicate the encrypted packet via the network stack, and the second classifier may intercept the packet. In yet another embodiment, the first classifier may communicate the encrypted packet to the second classifier via a memory mapped interface. Thus, in some embodiments, the first classifier may explicitly transfer the encrypted packet to the second classifier, while in other embodiments, the first classifier may simply transmit the packet agnostic to further processing or without knowledge of the second classifier's operations. In some embodiments, the second classifier may execute in a user level of the device. In many embodiments, the second classifier may operate on the packet at or above a transport layer of the network stack.

At step 810, in some embodiments, the second classifier may classify or reclassify the packet based on decrypted content of the encrypted packet. In one embodiment, the second classifier may classify the packet as corresponding to a second predetermined application via decrypted content of the packet, at or above a transport layer of the network stack. In one embodiment, the second classifier may parse the packet to identify one or more protocols identified within the packet. For example, in one embodiment, the second classifier may identify an application protocol of the decrypted packet and classify the packet as corresponding to a second predetermined application that utilizes the application protocol. In another embodiment, the second classifier may identify other information in the packet, including a protocol type, an application name, a data string, one or more data flags, or any other information that may identify the packet as corresponding to the second predetermined application.

In some embodiments, the second classifier may identify an application associated with application display or control data within the packet as the second predetermined application. In one embodiment, the second classifier may identify the second predetermined application within a tunnel of encrypted network traffic. In another embodiment, the second classifier may identify the second predetermined application from an unencrypted payload comprising a packet encapsulated with a tunnel protocol header, such as an TLS or SSL protocol.

At step 812, in some embodiments, the second classifier may determine whether to use the included application identifier or an application identifier of the second predetermined application. In one embodiment, the second classifier may determine to use the application identifier of the second predetermined application and may reclassify the encrypted packet. In one embodiment, the second classifier may determine that the second predetermined application is a more appropriate classification than the first predetermined application, and may replace the application identifier included with the packet with a second application identifier of or corresponding to the second predetermined application. For example, if the identification of the second predetermined application is more granular than the identification of the first predetermined application, then the second classifier may replace the application identifier included with the packet with an application identifier corresponding to the second predetermined application. In one embodiment, granularity may be determined responsive to parent-child relationships of applications and protocols, discussed above in connection with FIG. 5. For example, if a first identifier is a child of a second identifier, then the first identifier may be considered more granular. In another embodiment, the second classifier may determine that the first predetermined application is more granular than the second predetermined application, and may maintain or utilize the application identifier of the first classifier. For example, in one embodiment, the first classifier may identify network traffic as corresponding to a web application, and the second classifier may identify the network traffic as corresponding to HTTP traffic. In such a case, the first identification of web application may be more granular than the second identification of HTTP, which may include both HTTP web applications and other HTTP data. Once properly classified by either the first application or the second application, various QoS policies may be applied to the packet responsive to the classification.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method comprising:
   (a) maintaining, by a device, a list of applications for a remote display protocol, each application in the list having an assigned priority;
   (b) identifying, by the device, information about an application to be accessed via the remote display protocol encapsulated within remote display protocol traffic traversing the device;

(c) adding, by the device, the application and a corresponding priority to the list of applications for the remote display protocol, wherein the corresponding priority of the application is higher than a priority of a second application; and (d) prioritizing, by the device, traffic associated with the application encapsulated within remote display protocol traffic ahead of traffic associated with the second application encapsulated within remote display protocol traffic.

2. The method of claim 1, further comprises classifying, by the device, remote display protocol traffic according to the list of applications.

3. The method of claim 1, wherein the device is intermediary to a plurality of a clients and a plurality of servers.

4. The method of claim 1, wherein (a) further comprises maintaining, by the device, parent and child relationships between applications in the list of applications, at least one child application assigned the priority of a parent application.

5. The method of claim 1, wherein (b) further comprising parsing packets of the remote display protocol to identify the information about the application.

6. The method of claim 1, wherein (b) further comprises identifying that the application to be accessed is not in the list of applications.

7. The method of claim 1, wherein the application to be accessed via the remote display protocol comprises the application being requested to be executed and an output from the executed application to be displayed via the remote display protocol.

8. The method of claim 1, wherein (c) further comprises establishing, the device, an identifier of the application for which to identify the application in the list of applications.

9. The method of claim 1, further comprising:
identifying, by the device, within the remote display protocol traffic, information about a second application to be accessed via the remote display protocol,
wherein the prioritizing comprises:
determining, by the device, whether to use the information about the first application or the information about the second application; and
prioritizing the remote display protocol traffic using the determined information about the first or second application.

10. The method of claim 1, wherein the traffic associated with the application encapsulated within remote display protocol traffic and the traffic associated with the second application encapsulated within remote display protocol traffic are transmitted via the same port.

11. A system comprising:
a device configured to maintain a list of applications for a remote display protocol, each application in the list having an assigned priority;
a classifier of the device configured to identify information about an application to be accessed via the remote display protocol encapsulated within remote display protocol traffic traversing the device;
wherein the device is configured to add the application and a corresponding priority to the list of applications for the remote display protocol, wherein the corresponding priority of the application is higher than a priority of a second application; and
wherein the device is configured to prioritize traffic associated with the application encapsulated within remote display protocol traffic ahead of traffic associated with the second application encapsulated within remote display protocol traffic.

12. The system of claim 11, wherein the classifier is further configured to classify remote display protocol traffic according to the list of applications.

13. The system of claim 11, wherein the device is intermediary to a plurality of a clients and a plurality of servers.

14. The system of claim 11, wherein the device is further configured to maintain parent and child relationships between applications in the list of applications, at least one child application assigned the priority of a parent application.

15. The system of claim 11, wherein the classifier is further configured to parse packets of the remote display protocol to identify the information about the application.

16. The system of claim 11, wherein the classifier is further configured to identify that the application to be accessed is not in the list of applications.

17. The system of claim 11, wherein the application to be accessed via the remote display protocol comprises the application being requested to be executed and an output from the executed application to be displayed via the remote display protocol.

18. The system of claim 11, wherein the classifier is further configured to establish an identifier of the application for which to identify the application in the list of applications.

19. The system of claim 11, further comprising:
a second classifier of the device configured to identify within the remote display protocol traffic information about a second application to be accessed via the remote display protocol,
wherein the device determines whether to use the information about the first application or the information about the second application and prioritizes the remote display protocol traffic using the determined information about the first or second application.

20. The system of claim 11, wherein the traffic associated with the application encapsulated within remote display protocol traffic and the traffic associated with the second application encapsulated within remote display protocol traffic are transmitted via the same port.

* * * * *